US 12,346,181 B2
Jul. 1, 2025

(12) United States Patent
Kogo et al.

(54) ELECTRONIC CONTROL DEVICE AND ELECTRONIC CONTROL SYSTEM

(71) Applicant: Hitachi Astemo, Ltd., Hitachinaka (JP)

(72) Inventors: Kenji Kogo, Hitachinaka (JP); Koji Maeda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 99 days.

(21) Appl. No.: 18/285,116

(22) PCT Filed: Feb. 18, 2022

(86) PCT No.: PCT/JP2022/006524
§ 371 (c)(1),
(2) Date: Sep. 29, 2023

(87) PCT Pub. No.: WO2022/219920
PCT Pub. Date: Oct. 20, 2022

(65) Prior Publication Data
US 2024/0176404 A1 May 30, 2024

(30) Foreign Application Priority Data
Apr. 16, 2021 (JP) .................................. 2021-070000

(51) Int. Cl.
*G06F 1/26* (2006.01)
*B60R 16/023* (2006.01)
*H02J 3/38* (2006.01)

(52) U.S. Cl.
CPC .......... *G06F 1/263* (2013.01); *B60R 16/0231* (2013.01); *H02J 3/38* (2013.01)

(58) Field of Classification Search
None
See application file for complete search history.

(56) References Cited

U.S. PATENT DOCUMENTS

| 8,767,071 B1* | 7/2014 | Marshall | G08B 29/181 |
| | | | 320/108 |
| 10,261,535 B2* | 4/2019 | Boardman | H02J 3/26 |

(Continued)

FOREIGN PATENT DOCUMENTS

| JP | 2004-56197 A | 2/2004 |
| JP | 2006-287576 A | 10/2006 |

(Continued)

OTHER PUBLICATIONS

International Search Report (PCT/ISA/210) issued in PCT Application No. PCT/JP2022/006524 dated Mar. 22, 2022 with English translation (4 pages).

(Continued)

*Primary Examiner* — Fekadeselassie Girma
(74) *Attorney, Agent, or Firm* — Crowell & Moring LLP

(57) ABSTRACT

An object of the present invention is to provide an electronic control device and an electronic control system capable of achieving power supply redundancy while suppressing an increase in number of wirings. The present invention is an electronic control device 1 including a data processing circuit that performs data communication with one or more another electronic control devices, the electronic control device 1 including: a power source terminal 105 connected to a first power source 60; a first data terminal 101a to which a first external data line is connected; and a power source selection circuit that has an input side to which the power source terminal 105 and the first data terminal 101a are connected and an output side to which the data processing circuit 100 is connected, selects any one with a higher potential of power from the power source terminal 105 and the first data terminal 101a on the input side, and connects the selected one to the data processing circuit on the output side.

10 Claims, 15 Drawing Sheets

(56) References Cited

U.S. PATENT DOCUMENTS

| | | | |
|---|---|---|---|
| 10,444,815 B1* | 10/2019 | Sultenfuss | G06F 1/3296 |
| 2006/0224278 A1* | 10/2006 | Yanagida | B60R 16/0315 |
| | | | 701/1 |
| 2012/0331313 A1* | 12/2012 | Yoshioka | G06F 1/3284 |
| | | | 713/300 |
| 2014/0181551 A1* | 6/2014 | Rahal-Arabi | G06F 1/3296 |
| | | | 713/340 |
| 2016/0173290 A1 | 6/2016 | Yamada | |
| 2018/0059754 A1* | 3/2018 | Shaikh | G06F 1/189 |
| 2018/0120796 A1* | 5/2018 | Tegnell | G05B 19/0421 |
| 2019/0118739 A1 | 4/2019 | Takamatsu et al. | |
| 2019/0272013 A1* | 9/2019 | Nagatomi | G06F 1/263 |
| 2019/0372915 A1* | 12/2019 | Mendu | H04L 43/0847 |
| 2020/0393859 A1* | 12/2020 | Thompson | G05D 23/1917 |
| 2022/0267205 A1* | 8/2022 | Chien | C03C 3/097 |
| 2024/0339092 A1* | 10/2024 | Gilmore | G10C 3/00 |

FOREIGN PATENT DOCUMENTS

| | | | | |
|---|---|---|---|---|
| WO | WO-2014188633 A1 * | 11/2014 | | H02J 13/002 |
| WO | WO-2017222077 A1 * | 12/2017 | | B60K 37/00 |

OTHER PUBLICATIONS

Japanese-language Written Opinion (PCT/ISA/237) issued in PCT Application No. PCT/JP2022/006524 dated Mar. 22, 2022 with English translation (7 pages).

* cited by examiner

ELECTRONIC CONTROL DEVICE AND ELECTRONIC CONTROL SYSTEM

TECHNICAL FIELD

The present invention relates to an electronic control device and an electronic control system, and more specifically, to an electronic control device and an electronic control system using power source redundancy.

BACKGROUND ART

In recent years, there have been social problems such as reduction of traffic accidents, reduction of damage, and provision of transportation means and the like to vulnerable road users, and technological development for implementing automated driving of a vehicle has been advanced. Exemplary functions required for a driving automation level are defined by the Society of Automotive Engineers (SAE). The SAE defines that a driver is responsible for an accident of a vehicle with a driving automation level of 2 or lower, and a system is responsible for an accident of a vehicle with Level 3 or higher.

Level 3 is conditional automated driving, in which the system normally performs driving control and surrounding monitoring, and the driver performs traveling control only in an emergency. At Level 3, it may not be possible to immediately transfer control of the vehicle to the driver because the driver is not always holding the steering wheel. Therefore, it is required for the system to perform safe traveling for a time from when the system detects a failure to when the control of the vehicle is transferred to the driver. That is, it is necessary to construct a redundant system that does not completely stop the system even when a failure occurs and transitions to a degeneration system for limiting a function or the like and performs traveling.

In automated driving of Level 2, a subject of driving control is the driver, the system is for the purpose of driving assistance, and the system is a single system. FIG. 13 is a schematic diagram of a single system configuration of Level 2 or lower using a brake as an example. An actuator (brake) 800 performs braking by a signal from an electronic control device (electronic control unit (ECU)) 801.

The ECU 801 is driven by power supplied from a power source 802 mounted on the vehicle via a power line 803. Then, the ECU 801 monitors the surroundings based on information from a sensor 804 (front monitoring radar or the like), and transmits a stop signal to the actuator (brake) 800 via a data line 805 when it is determined that it is dangerous. Even in a case where a part of the system fails and cannot operate normally, the driver is responsible for driving control and depresses the brake to stop the vehicle, so that there is no problem for the system. A "driver+" in FIG. 13 indicates that, in addition to the automatic system, the driver is responsible for the brake.

On the other hand, in the automated driving of Level 3 or higher, since the subject of the driving control is transferred to the system, there is no driver. Under such a situation, even in a case where a part of the system fails, the system is required to safely stop the vehicle, and thus, redundancy of the system is essential.

FIG. 14 is a schematic diagram of a dual system configuration of Level 3 or higher using the brake as an example. A double system is formed by parallelizing the single system (FIG. 13) including power sources 802a and 802b and power lines 803a and 803b. With this configuration, even in a case where one system fails, the other system can stop the vehicle. However, since the power source and the power line affect the entire system, in particular, redundancy of two independent systems is strongly required.

In addition, since the system is the subject of driving control at Level 3 or higher, surrounding monitoring is required in a wide range and with high accuracy. Therefore, in a camera sensor, which is a type of sensor, the number of pixels is increased from 2M pixels to 8M pixels for higher resolution to obtain clearer image quality, thereby y improving detection accuracy. As described above, the amount of data required for traveling rapidly increases, and 10 Gbps-class high-speed communication has been adopted in communication between electronic control devices.

In recent years, along with a change in architecture of a vehicle network, redundancy of an in-vehicle network system has been a problem. FIG. 15 illustrates an in-vehicle backbone network configuration in a daisy chain described in PTL 1. FIG. 15 is created based on FIG. 90 of PTL 1.

In PTL 1 (paragraphs [0431] to [0436]), two independent power sources 900a and 900b are mounted in a vehicle, and are connected by a power line 901 via a power source switch 902. The power line 901 is used as a backbone network of the daisy chain to connect electronic control devices (ECU) 903a, 903b, and 903c. The ECUs 903a, 903b, and 903c communicate with each other by superimposing data on the power line 901. Normally, power is supplied only from the power source 900a via the power line 901. When a failure (the cross mark in FIG. 15) occurs due to cable disconnection, the power source switch 902 is turned on, and power is also supplied from the power source 900b. That is, power is supplied from the power source 900a to the ECU 903a via the power line 901a, and power is supplied from the power source 900b to the ECUs 903b and 903c via the power line 901b, thereby implementing redundancy of the system.

CITATION LIST

Patent Literature

PTL 1: WO 2017/222077 A

SUMMARY OF INVENTION

Technical Problem

The configuration of PTL 1 (FIG. 15 of the present application) as described above is a configuration in which a signal is superimposed on the power line 901, and the power line 901 is not impedance-matched, and it is difficult to perform 10 Gbps-class data communication. Therefore, it is difficult to apply such a configuration to a system of Level 3 or higher because camera data cannot be transmitted.

In power source redundancy required in a system of Level 3 or higher, it is preferable to install at least three networks of a main power source network, a redundant power source network, and a data wiring network in the entire vehicle by wired cables. However, the number of wiring increases, leading to an increase in weight of a wire harness.

The present invention has been made in view of the above problems, and an object of the present invention is to provide an electronic control device and an electronic control system capable of achieving power supply redundancy while suppressing an increase in number of wirings.

Solution to Problem

In order to achieve the above object, an electronic control device according to the present invention is an electronic control device including a data processing circuit that performs data communication with one or more another electronic control devices, the electronic control device including: a power source terminal that is connected to a first power source; a first data terminal to which a first external data line for performing data communication with the another electronic control device and receiving power supplied from the another electronic control device is connected; a first internal data line that connects the first data terminal and the data processing circuit and transfers a data signal from the first data terminal to the data processing circuit; and a power source selection circuit that has an input side to which the power source terminal and the first data terminal are connected and an output side to which the data processing circuit is connected, selects any one with a higher potential of power to be supplied to the data processing circuit from the power source terminal and the first data terminal on the input side, and connects the selected one to the data processing circuit on the output side.

Advantageous Effects of Invention

According to the present invention, by making it possible to use the first external data line as a second external power line separately from a first external power line, it is possible to ensure redundancy of power supply to the data processing circuit while suppressing the number of external power lines. Further features related to the present invention will become apparent from the description of the present specification and the accompanying drawings. Problems, configurations, and effects other than those described above will become apparent by the following description of embodiments.

DESCRIPTION OF EMBODIMENTS

A. First Embodiment

Figure 1:
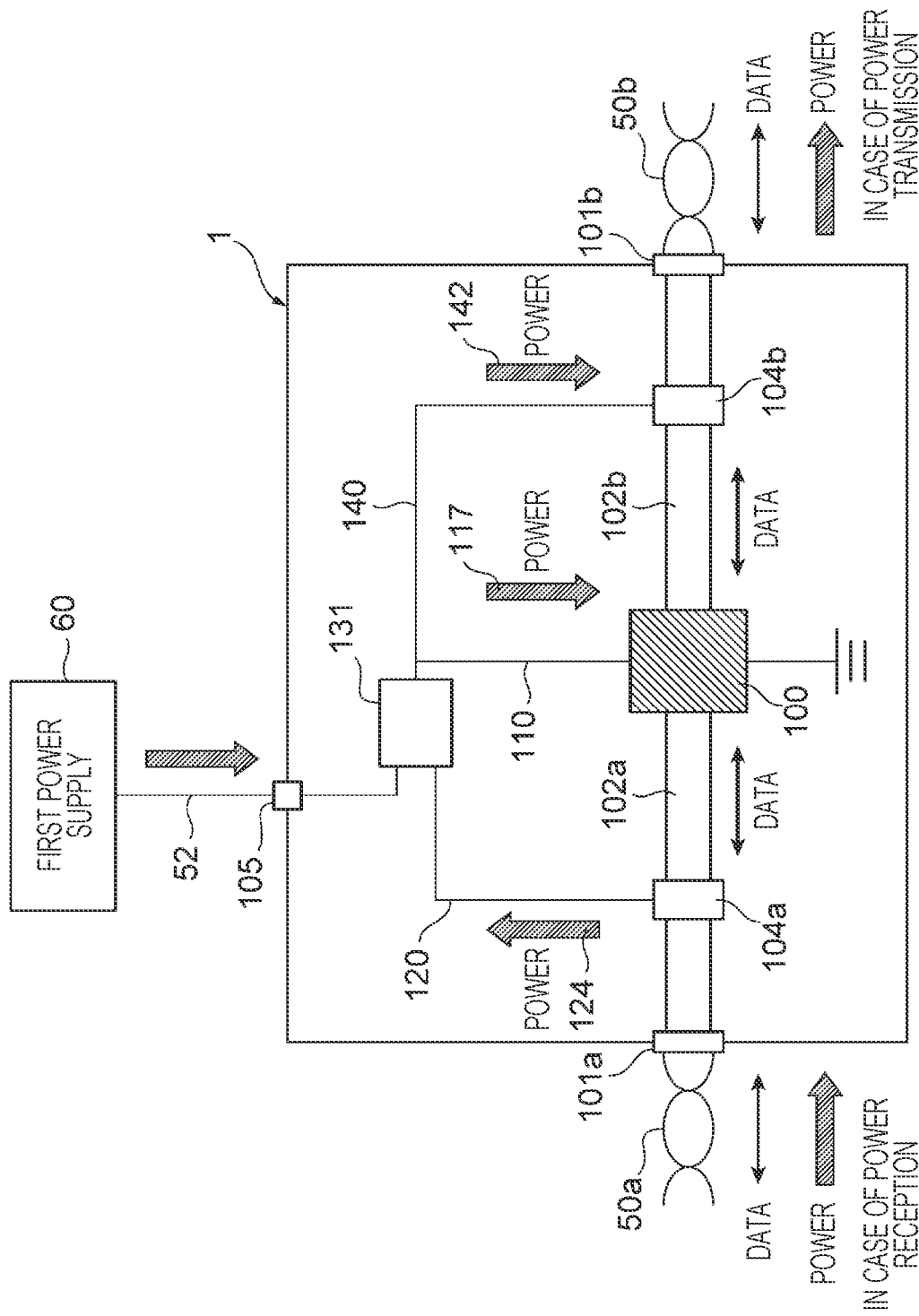
FIG. 1 is a diagram illustrating a configuration of an electronic control device according to a first embodiment of the present invention.

FIG. 1 is a diagram illustrating a configuration of an electronic control device according to a first embodiment of the present invention.

The electronic control device (hereinafter, also referred to as "ECU 1") 1 is mounted on a vehicle, for example, and performs various types of control related to the vehicle.

The ECU 1 performs data communication with a plurality of other electronic control devices via a first external data line 50a and a second external data line 50b. The first external data line 50a and the second external data line 50b are impedance-matched, and enable power transmission and power reception in addition to data communication. The first external data line 50a and the second external data line 50b may be the same as or different from each other.

The ECU 1 is connected to a first power source 60, and can receive power supplied from the first power source 60. The ECU 1 includes a first data terminal 101a connected to the first external data line 50a and can receive power supplied from another electronic control device by superimposing power on the first external data line 50a, thereby achieving power supply redundancy.

The ECU 1 includes a power source terminal 105 that is connected to the first power source 60, the first data terminal 101a to which the first external data line 50a for performing data communication with another electronic control device and receiving power supplied from the another electronic control device is connected, a first internal data line 102a that connects the first data terminal 101a and a data processing circuit 100 and transfers a data signal from the first data terminal 101a to the data processing circuit 100, and a power source selection circuit 131 that has an input side to which the power source terminal 105 and the first data terminal 101a are connected and an output side to which the data processing circuit 100 is connected, selects any one with a higher potential of power to be supplied to the data processing circuit 100 from the power source terminal 105 and the first data terminal 101a on the input side, and connects the selected one to the data processing circuit 100 on the output side.

The ECU 1 includes the power source terminal 105 connected to the first power source 60 via a first power source line 52. The power source terminal 105 is connected to the data processing circuit 100 via a first internal power line 110. Hereinafter, a power supply path including the power source terminal 105 and the first internal power line 110 is referred to as a first power supply path 117. The first internal power line 110 is provided with the power source selection circuit 131, and is connected with a second internal power line 120. The second internal power line 120 connects the power source selection circuit 131 of the first internal power line 110 and a filter circuit 104a. The second internal power line 120 allows a current to pass from the first data terminal 101a toward the first internal power line 110.

The first internal data line 102a is provided with the filter circuit 104a that separates data and power. The filter circuit 104a separates data and power input from the first external data line 50a to the first data terminal 101a, supplies the data to the data processing circuit 100, and supplies the power from the second internal power line 120 to the power source selection circuit 131. Hereinafter, a power supply path formed by the first data terminal 101a, a portion of the first internal data line 102a (a portion from the first data terminal 101a to the filter circuit 104a), the second internal power line 120, and a portion of the first internal power line 110 (a portion from the power source selection circuit 131 to the data processing circuit 100) is referred to as a second power supply path 124.

When a potential of the power source terminal 105 is equal to or higher than a potential of the first data terminal 101a, the power source selection circuit 131 connects the power source terminal 105 and the first internal power line 110, and supplies the power of the first power source 60 to the data processing circuit 100 through the first power supply path 117. Then, for example, when the potential of the power source terminal 105 is lower than the potential of the first data terminal 101a due to a failure or the like of the first power source 60, a power supply route is switched by the power source selection circuit 131, the second internal power line 120 and the first internal power line 110 are connected, and power supplied to the first data terminal 101a via the first external data line 50a is supplied to the data processing circuit 100 via the second power supply path 124.

In addition, the ECU 1 according to the present embodiment includes a second data terminal 101b connected to a second external data line 50b, and can further supply power to another electronic control device by superimposing power on the second external data line 50b. The ECU 1 includes the second data terminal 101b to which the second external data line 50b for performing data communication with another electronic control device different from the another electronic control device and supplying power to the another different electronic control device is connected. The output side of the power source selection circuit 131 is connected not only to the data processing circuit 100 but also to the second data terminal 101b.

The second data terminal 101b and the data processing circuit 100 are connected by a second internal data line 102b, and the electronic control device 1 can bidirectionally communicate data with the another different electronic control device from the second data terminal 101b via the second external data line 50b. A filter circuit 104b that combines data and power is provided in the middle of the second internal data line 102b.

The filter circuit 104b and the power source selection circuit 131 are connected by a third internal power line 140, and power from a power source selected by the power source selection circuit 131 is supplied to the filter circuit 104b through the third internal power line 140. In the filter circuit 104b, power supplied from the third internal power line 140 and data supplied from the data processing circuit 100 are combined and output from the second data terminal 101b to the another different electronic control device via the second external data line 50b. Hereinafter, a power supply path formed by the power source selection circuit 131, the third internal power line 140, and a portion of the second internal data line 102b (a portion from the filter circuit 104b to the second data terminal 101b) is referred to as a third power supply path 142.

According to the first embodiment, a path for power supply to the data processing circuit 100 is switched to either the first power supply path 117 from the first power source 60 to the data processing circuit 100 or the second power supply path 124 from the another electronic control device to the data processing circuit 100. The power source selection circuit 131 compares power input from the power source terminal 105 with other power input from the first data terminal 101a, selects one of them, and outputs the selected power as a power source for the data processing circuit 100 or the like. The power selected by the power source selection circuit 131 is either power input from the first power source 60 to the power source selection circuit 131 via the power source terminal 105 or power input from the first external data line 50a to the power source selection circuit 131 via the first data terminal 101a, the filter circuit 104a, and the second internal power line 120. In a case where a failure occurs on a power source side outputting power due to a failure or the like of any power source during operation, the operation can be continued by performing switching to the other power source, thereby implementing power source redundancy.

With the configuration of the ECU 1 described above, power supply redundancy can be achieved while suppressing an increase in number of wirings. Therefore, it is possible to achieve system redundancy while suppressing an increase in weight of a wire harness.

B. Second Embodiment

B-1. Configuration

B-1-1. Overall Configuration

Figure 2:
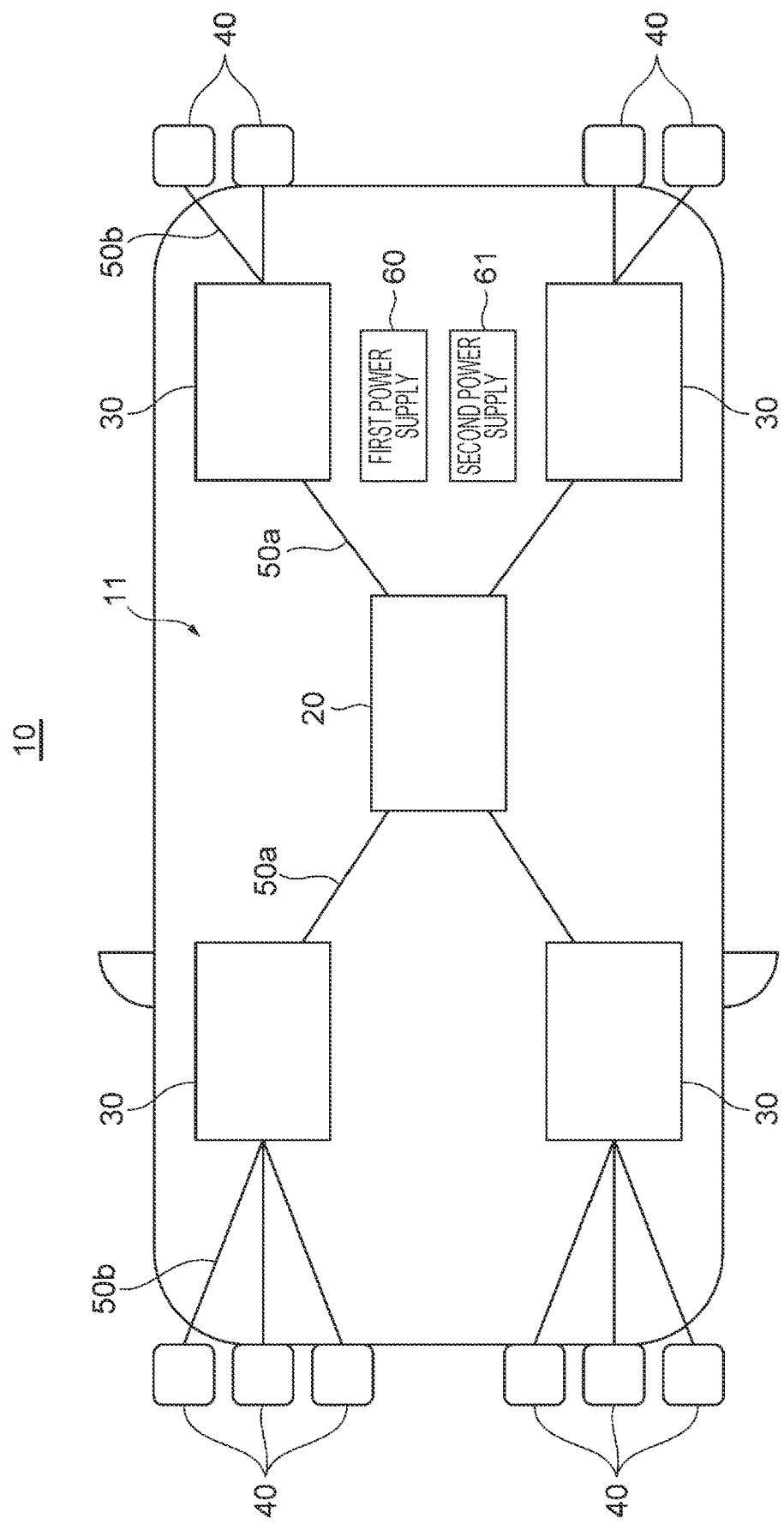
FIG. 2 is a diagram schematically illustrating a vehicle equipped with an electronic control system (or an in-vehicle network) according to a second embodiment of the present invention.

FIG. 2 is a diagram schematically illustrating a vehicle 10 equipped with an electronic control system 11 (or an in-vehicle network) according to a second embodiment of the present invention. The electronic control system 11 includes an integrated electronic control device 20, area electronic control devices 30, and terminal electronic control devices 40.

The terminal electronic control devices 40 (hereinafter, also referred to as "terminal ECUs 40" or "ECUs 40") individually control various sensors, actuators, and the like, and are disposed at various places of the vehicle 10. The terminal ECU 40 performs various types of control such as surrounding monitoring, engine information acquisition, and control. The integrated electronic control device 20 (hereinafter, also referred to as "integrated ECU 20" or "ECU 20") grasps the state of the entire vehicle 10 and a surrounding situation based on various types of information from each terminal ECU 40, creates an action plan for continuing safe traveling, and transmits control information to each terminal ECU 40.

When all the terminal ECUs 40 and the integrated ECU 20 are directly connected, the number of data input/output terminals of the integrated ECU 20 and the number of wire harnesses (wirings) for connection increase explosively. Therefore, as a relay for aggregating and spreading data, the area electronic control device 30 (hereinafter, also referred to as "area ECU 30" or "ECU 30") is provided between the terminal ECU 40 and the integrated ECU 20. In addition, a configuration in which all the pieces of data from the terminal ECU 40 are transmitted to the integrated ECU 20 is also possible. However, in this case, the integrated ECU 20 requires an enormous processing capacity, and thus, a measure for heat dissipation is required, and the cost increases, which is problematic. Therefore, although not illustrated, data can be processed by each of the ECUs 30 and 40 depending on a function using a central processing unit (CPU) included in each of the ECUs 30 and 40.

The integrated ECU 20 and each area ECU 30 perform data communication via a first external data line 50a. Each area ECU 30 and each terminal ECU 40 perform data communication via a second external data line 50b.

In addition, the electronic control system 11 includes a plurality of power sources for redundancy, that is, a first power source 60 and a second power source 61. The first power source 60 and the second power source 61 can be implemented by, for example, a secondary battery or a generator. The generator also includes an alternator. The integrated ECU 20 receives power from each of the first power source 60 and the second power source 61. The area ECU 30 receives power only from the first power source 60. In the second embodiment, power can be supplied from the integrated ECU 20 to the area ECU 30 by superimposing power on the first external data line 50a. As a result, power supply redundancy for the area ECU 30 is achieved (details will be described below with reference to FIG. 3).

Only some of the area ECUs 30 may receive power using power source redundancy. In this case, the area ECU 30 that does not use power source redundancy may receive power from one or both of the first power source 60 and the second power source 61. The terminal ECU 40 receives power from the first power source 60 or the second power source 61.

B-1-2. Configuration of Each ECU

B-1-2-1. Outline

Figure 3:
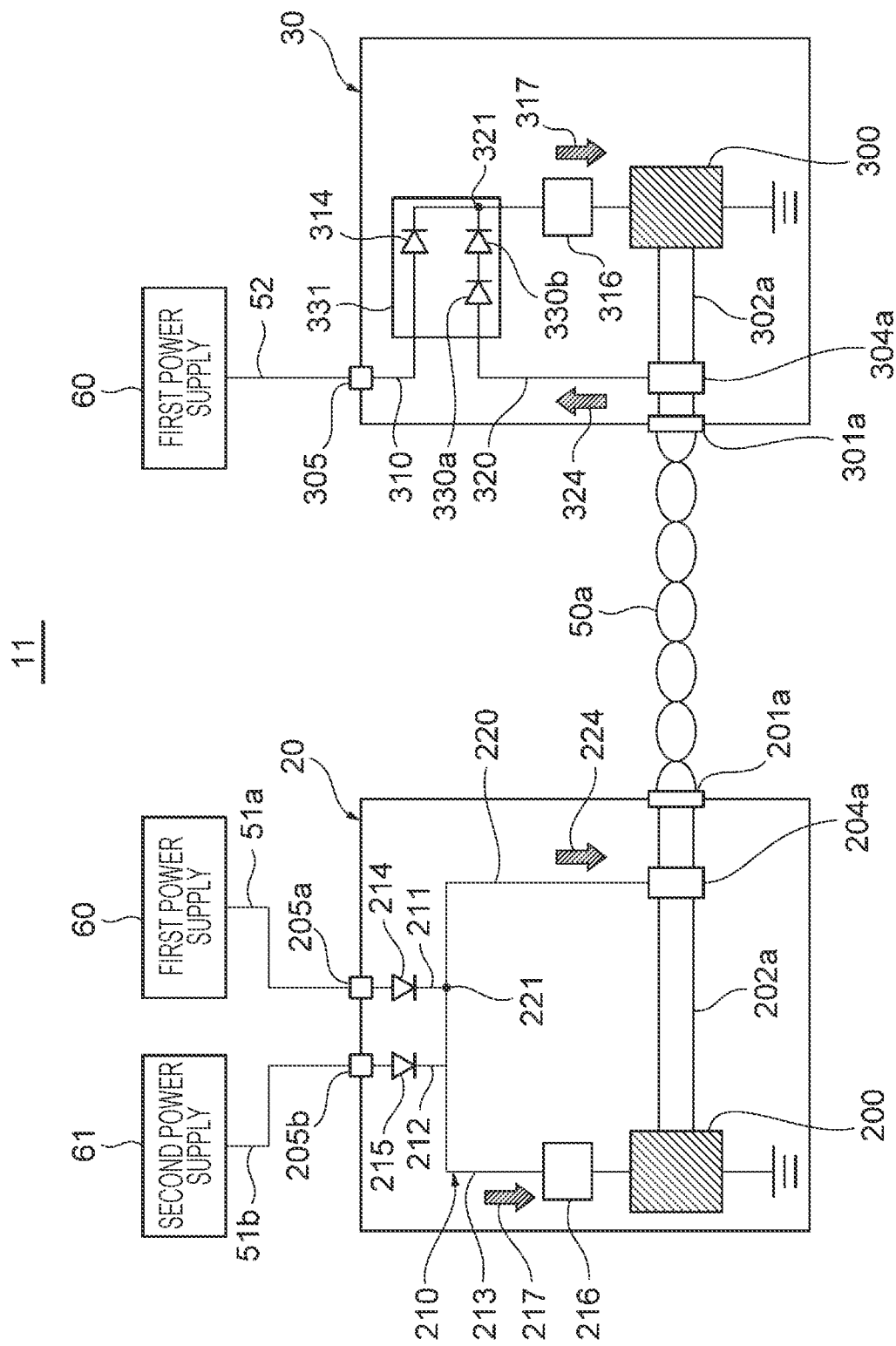
FIG. 3 is a diagram illustrating a configuration of a part of the electronic control system according to the second embodiment.

FIG. 3 is a diagram illustrating a configuration of a part of the electronic control system 11 according to the second embodiment. FIG. 3 illustrates two ECUs, that is, the integrated ECU 20 and the area ECU 30. The integrated ECU 20 and the area ECU 30 perform bidirectional data communication with each other. The integrated ECU 20 and the area ECU 30 correspond to a second electronic control device and a first electronic control device of claim 5, respectively. The terminal ECU 40 individually receives power supplied from the first power source 60 or the second power source 61, and thus is not illustrated in FIG. 3.

As illustrated in FIG. 3, the integrated ECU 20 receives power from the first power source 60 and the second power source 61. In addition, power is supplied from the first power source 60 to the area ECU 30. Furthermore, power supplied from the first power source 60 or the second power source 61 to the integrated ECU 20 is supplied to the area ECU 30 via the first external data line 50a (power source redundancy).

The integrated ECU 20 and the area ECU 30 include data processing circuits 200 and 300, respectively, the data processing circuits 200 and 300 executing data processing according to respective functions. The data processing circuits 200 and 300 process a signal of a switch, an LSI, or a system on chip (SoC) in the electronic control system 11. The data processing circuits 200 and 300 of the integrated ECU 20 and the area ECU 30 perform data communication with each other through the first external data line 50a.

B-1-2-2. Integrated ECU 20

The integrated ECU 20 is provided with a plurality of first data input/output terminals 201a (hereinafter, also referred to as "first data terminals 201a") to which the first external data line 50a is connected, and a plurality of first internal data lines 202a connecting the first data terminals 201a and the data processing circuit (second data processing circuit) 200. A filter circuit 204a is provided on the first internal data line 202a. Details of the filter circuit 204a will be described below with reference to FIG. 4. The data processing circuit 200 of the integrated ECU 20 transmits and receives a signal to and from the data processing circuit (first data processing circuit) 300 of the area ECU 30 via the first internal data line 202a, the first data terminal 201a, and the first external data line 50a.

In addition, the integrated ECU 20 includes power source terminals 205a and 205b as input/output interfaces for the first power source 60 and the second power source 61. A first power source line 51a connected to the first power source 60 is connected to the power source terminal 205a, and a second power source line 51b connected to the second power source 61 is connected to the power source terminal 205b. The power source terminals 205a and 205b are connected to the data processing circuit 200 via a first internal power line 210. The first internal power line 210 includes a branch portion 211 connected to the power source terminal 205a, a branch portion 212 connected to the power source terminal 205b, and a merging portion 213 where the branch portions 211 and 212 merge. The branch portions 211 and 212 are provided with rectifier circuits including first rectifier elements 214 and 215 such as diodes.

The rectifier circuits supply power from the first power source 60 to the data processing circuit 200 when a potential of the first power source 60 is higher than that of the second power source 61, and supply power from the second power source 61 to the data processing circuit 200 and the first data terminal 201a when the potential of the first power source 60 is lower than that of the second power source 61.

A step-down DC/DC converter 216 is provided at the merging portion 213 of the first internal power line 210. The DC/DC converter 216 steps down a power source voltage of the first power source 60 or the second power source 61 and supplies the power source voltage to the data processing circuit 200. With this configuration, a voltage of a power source signal superimposed on the first external data line 50a is set to a voltage higher than a driving voltage of the data processing circuit 200, such as 12 V, 24 V, 36 V, or 48 V, thereby suppressing an increase in power transmission loss. Depending on specifications of the integrated ECU 20, the DC/DC converter 216 may be a step-up/step-down converter or a step-up converter. Hereinafter, a power supply path including the power source terminals 205a and 205b and the first internal power line 210 is referred to as a first power supply path 217.

A second internal power line 220 is connected to the first internal power line 210. The second internal power line 220 connects a coupling portion 221 for the first internal power line 210 and the filter circuit 204a. As a result, power from the first power source 60 or the second power source 61 via the power source terminal 205a or 205b can also be supplied to the filter circuit 204a.

Figure 4:
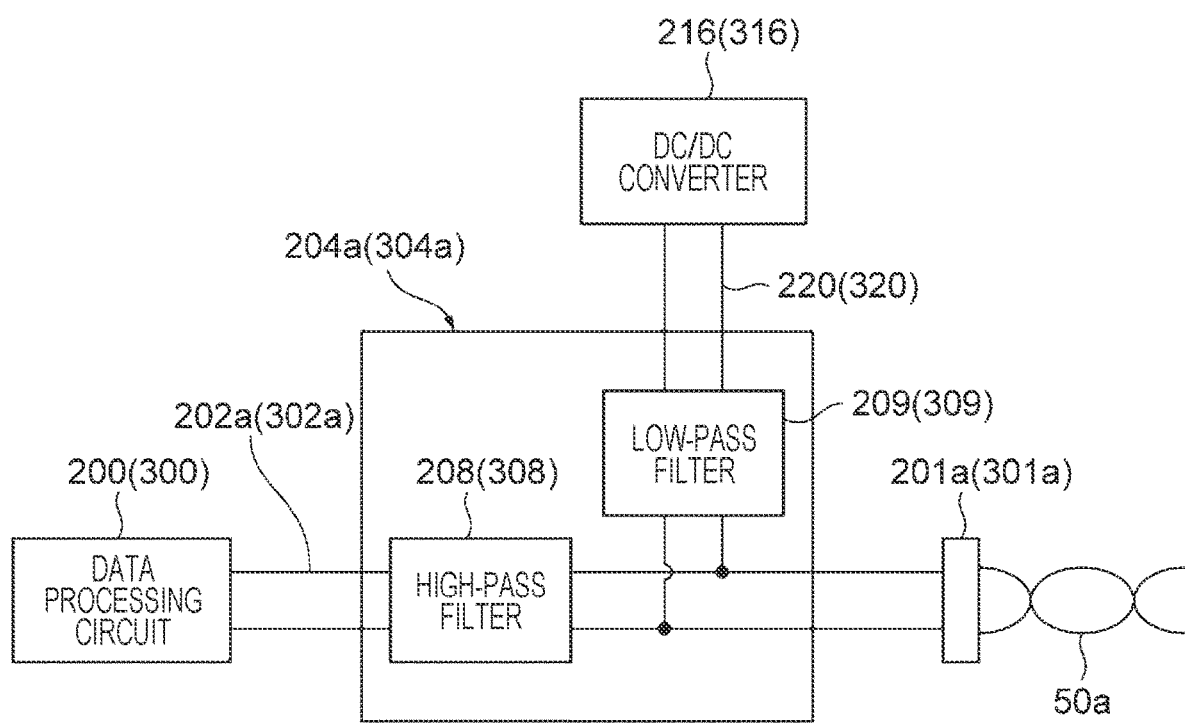
FIG. 4 is a diagram illustrating a configuration of a filter circuit and the like according to the second embodiment and the periphery thereof.

FIG. 4 is a diagram illustrating a configuration of the filter circuit 204a (and a filter circuit 304a to be described below) according to the second embodiment and the periphery thereof. However, the left and right of the filter circuit 304a and the periphery thereof in FIG. 4 are reversed from a positional relationship in FIG. 3. The filter circuit 204a combines or separates a data signal and a power source signal. Since the data signal and the power source signal have different frequency components, the data signal and the power source signal can be separated or combined by filters having different frequency characteristics. The filter circuit 204a includes a high-pass filter 208 disposed on the first internal data line 202a and a low-pass filter 209 disposed on the second internal power line 220.

The high-pass filter 208 is implemented by capacitors or the like arranged in series. Therefore, the high-pass filter 208 does not pass a signal in a low frequency band such as a power source signal but passes only a data signal in a high frequency band. Therefore, the high-pass filter 208 passes a data signal from the data processing circuit 200 of the integrated ECU 20 to the data processing circuit 300 of the area ECU 30 and a data signal from the data processing circuit 300 of the area ECU 30 to the data processing circuit 200 of the integrated ECU 20. However, the high-pass filter 208 does not pass a power source signal supplied from the first power source 60 or the second power source 61 via the second internal power line 220, toward the data processing circuit 200 or the first data terminal 201a.

The low-pass filter 209 is implemented by arranging coils or ferrite beads in series. Therefore, the low-pass filter 209 passes a signal in a low frequency band such as a power source signal and does not pass a data signal in a high frequency band. Therefore, the low-pass filter 209 passes a power source signal supplied from the first power source 60 or the second power source 61 via the second internal power line 220, toward the first data terminal 201a. However, the low-pass filter 209 does not pass a data signal from the data processing circuit 200 of the integrated ECU 20 to the data processing circuit 300 of the area ECU 30 and a data signal from the data processing circuit 300 of the area ECU 30 to the data processing circuit 200 of the integrated ECU 20, toward the second internal power line 220 side. Hereinafter, a power supply path formed by the second internal power line 220, a portion of the first internal data line 202a (a portion from the filter circuit 204a to the first data terminal 201a), and the first data terminal 201a is referred to as a second power supply path 224 (FIG. 3).

Figure 5A:
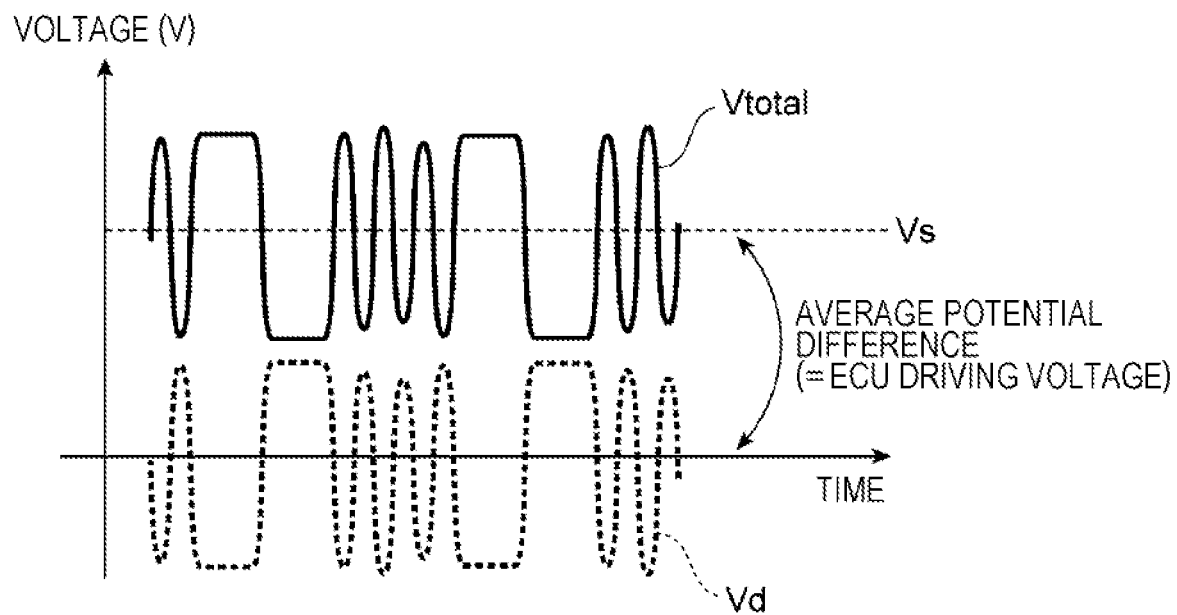
FIGS. 5A and 5B are diagrams illustrating an example of a signal used in the electronic control system according to the second embodiment.
Figure 5B:
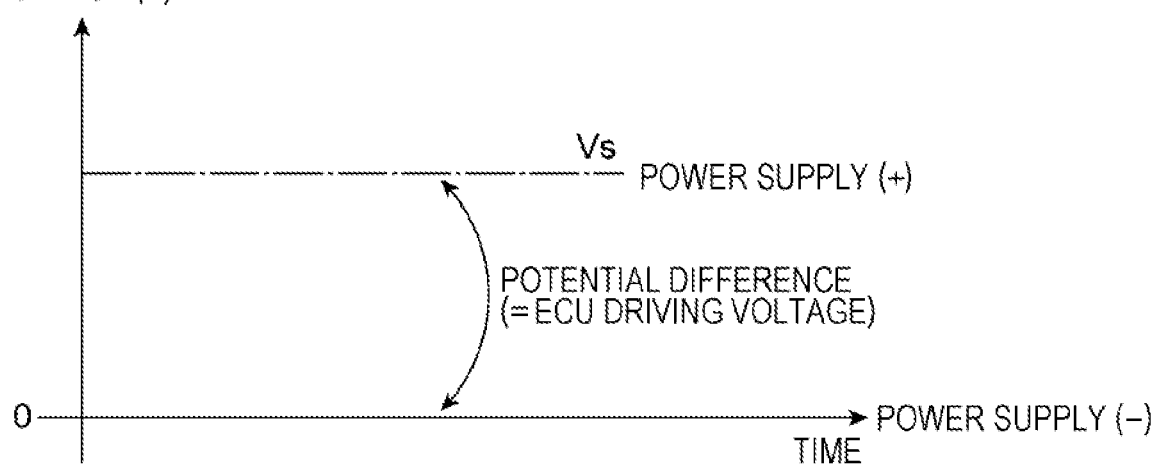

FIGS. 5A and 5B are diagrams illustrating an example of a signal used in the electronic control system 11 according to the second embodiment. In FIG. 5A, a voltage Vd is a voltage of a data signal output from the data processing circuit 200 of the integrated ECU 20 (that is, a voltage on the first internal data line 202a between the data processing circuit 200 and the high-pass filter 208). A voltage Vs is a power source voltage of the first power source 60 or the second power source 61 supplied via the second internal power line 220 of the integrated ECU 20. A voltage Vtotal indicates a voltage obtained by superimposing the voltage Vd and the voltage Vs (that is, a voltage on the first external data line 50a). FIG. 5B is a diagram in which only the power source voltage Vs of FIG. 5A is extracted. An average potential difference between a power source (+) and a power source (−) corresponds a driving voltage of the electronic control device 1.

As can be seen from the above, a power source signal is superimposed on a data signal in the first external data line 50a of the second embodiment, and communication and power transmission and reception are performed by the first external data line 50a.

B-1-2-3. Area ECU 30

Returning to FIG. 3, next, the configuration of the area ECU 30 will be described. Among constituent elements of the area ECU 30, constituent elements equivalent to those of the integrated ECU 20 are denoted by the same reference signs, and a detailed description thereof will be omitted.

The area ECU 30 is provided with a plurality of first data terminals 301a to which the first external data line 50a is connected, and a plurality of first internal data lines 302a connecting the first data terminals 301a and the data processing circuit 300. The filter circuit 304a is provided on the first internal data line 302a. The data processing circuit 300 of the area ECU 30 transmits and receives a signal to and from the data processing circuit 200 of the integrated ECU 20 via the first internal data line 302a, the filter circuit 304a, the first data terminal 301a, and the first external data line 50a.

As described above, a data signal from the data processing circuit 200 and a power source signal from the first power source 60 or the second power source 61 are superimposed in a signal supplied from the integrated ECU 20 to the area ECU 30 via the first external data line 50a. The data signal in the superimposed signal is extracted by a high-pass filter 308 (FIG. 4) of a filter circuit 304a of the area ECU 30 and supplied to the data processing circuit 300.

In addition, the area ECU 30 includes a power source terminal 305 as an input/output interface for the first power source 60. A power source line 52 connected to the first power source 60 is connected to the power source terminal 305. The integrated ECU 20 includes two power source terminals 205a and 205b, but the area ECU 30 includes one power source terminal 305.

The power source terminal 305 is connected to the data processing circuit 300 via a first internal power line 310. The first internal power line 310 is provided with a first rectifier element 314 such as a diode and a step-down DC/DC converter 316. The first rectifier element 314 prevents backflow toward the first power source 60. The DC/DC converter 316 steps down a power source voltage of the first power source 60 and supplies the power source voltage to the data processing circuit 300. Depending on specifications of the area ECU 30, the DC/DC converter 316 may be a step-up/step-down converter or a step-up converter. Hereinafter, a power supply path including the power source terminal 305 and the first internal power line 310 is referred to as a first power supply path 317.

A second internal power line 320 is connected to the first internal power line 310. The second internal power line 320 connects a coupling portion 321 for the first internal power line 310 and the filter circuit 304a. The second internal power line 220 of the integrated ECU 20 passes a current from the first power source 60 and the second power source 61 to the first data terminal 201a. In other words, the second internal power line 220 of the integrated ECU 20 is for supplying power from the integrated ECU 20 to the area ECU 30.

On the other hand, the second internal power line 320 of the area ECU 30 according to the second embodiment passes a current from the first data terminal 301a toward the first internal power line 310. That is, as described above, a data signal from the data processing circuit 200 and a power source signal from the first power source 60 or the second power source 61 are superimposed in a signal supplied from the integrated ECU 20 to the area ECU 30 via the first external data line 50a (see FIG. 5(A)). The power source signal (power source voltage) in the superimposed signal is extracted by a low-pass filter 309 (FIG. 4) of the filter circuit 304a of the area ECU 30 and supplied to the second internal power line 320 (see FIG. 5(B)).

Therefore, even in a case where power is not supplied from the first power source 60 to the area ECU 30 via the power source terminal 305 of the area ECU 30 for some reason, power can be supplied from the integrated ECU 20 to the data processing circuit 300 of the area ECU 30 via the first external data line 50a. Hereinafter, a power supply path formed by the first data terminal 301a, a portion of the first internal data line 302a (a portion from the first data terminal 301a to the filter circuit 304a), the second internal power line 320, and a portion of the first internal power line 310 (a portion from the coupling portion 321 to the data processing circuit 300) is referred to as a second power supply path 324.

Second rectifier elements 330a and 330b (diodes and the like) that pass a current from the filter circuit 304a to the coupling portion 321 are provided on the second internal power line 320 of the area ECU 30. This makes it possible to prevent backflow from the first internal power line 310 toward the filter circuit 304a.

In the area ECU 30, the first rectifier element 314 on the first internal power line 310 and the second rectifier elements 330a and 330b on the second internal power line 320 are included in a power source selection circuit 331. The first rectifier element 314 and the second rectifier elements 330a and 330b can be of the same specification, and may also be of different specifications. The power source selection circuit 331 selects one of the first power supply path 317 and the second power supply path 324 to supply power to the data processing circuit 300. In the second embodiment, the power source selection circuit 331 selects any one with a higher supply voltage (potential) for the data processing circuit 300 from the first power supply path 317 and the second power supply path 327.

The power source selection circuit 331 has an input side connected to the power source terminal 305 and the first data terminal 301a and an output side connected to the data processing circuit 300, and has a function of selecting any one with a higher potential of power to be supplied from the power source terminal 305 and the first data terminal 301a on the input side and connecting the selected one to the data processing circuit 300 on the output side.

Figure 6:
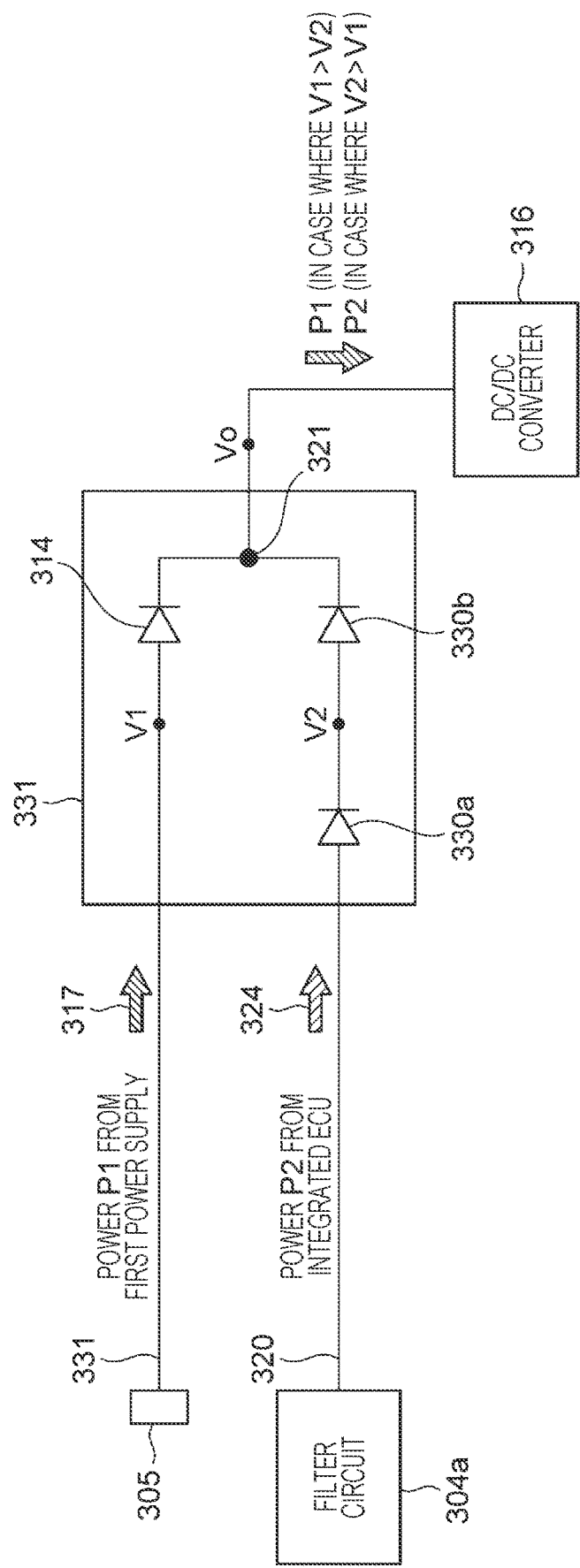
FIG. 6 is a diagram illustrating a configuration of a power source selection circuit of an area electronic control device according to the second embodiment.

FIG. 6 is a diagram illustrating a configuration of the power source selection circuit 331 of the area ECU 30 according to the second embodiment. In a normal state of the second embodiment, power P1 from the first power source 60 is supplied to the data processing circuit 300 via the first power supply path 317.

That is, the power source voltages of the first power source 60 and the second power source 61 are designed to be equal in a normal state. In addition, a voltage drop of the second power supply path 324 by the second rectifier elements 330a and 330b is set to be larger than a voltage drop of the first power supply path 317 by the first rectifier element 314. Therefore, in the normal state, since an output voltage of the first rectifier element 314 (or a voltage V1 before the first rectifier element 314) is higher than an output voltage of the second rectifier element 330b closest to the coupling portion 321 (or a voltage V2 before the second rectifier element 330b) (V1>V2), an output voltage Vo on the coupling portion 321 side is equal to the output voltage of the first rectifier element 314. As a result, the power P1 from the first power source 60 is supplied to the data processing circuit 300 via the first power supply path 317.

In addition, in a case where the output voltage of the first rectifier element 314 (or the voltage V1 before the first rectifier element 314) is lower than the output voltage of the second rectifier element 330b closest to the coupling portion 321 (or the voltage V2 before the second rectifier element 330b) (V1<V2) due to an abnormality of the first power source 60 or the like, the output voltage Vo on the coupling portion 321 side is equal to the output voltage of the second rectifier element 330b. As a result, power P2 from the integrated ECU 20 is supplied to the data processing circuit 300 via the second power supply path 324. Therefore, redundancy of power supply to the data processing circuit 300 can be implemented.

A portion of the first internal power line 310 where the first rectifier element 314 causes a voltage drop is referred to as a first voltage drop portion, and a portion of the second internal power line 320 where the second rectifier elements 330a and 330b cause a voltage drop is referred to as a second voltage drop portion. In the second embodiment, the first voltage drop portion includes one first rectifier element 314. The first voltage drop portion may have a different configuration (for example, two first rectifier elements 314). The second voltage drop portion includes a plurality of (two) second rectifier elements 330a and 330b.

The first rectifier element 314 and the second rectifier elements 330a and 330b are arranged in parallel with the input side as an anode and the output side as a cathode, and the cathode side is consolidated as one coupling portion 321. Each of the rectifier elements 314, 330a, and 330b compares a voltage of the anode with a voltage of the cathode, and is conducted when the voltage of the anode is higher, and is insulated when the voltage of the anode is lower. That is, in this example, the voltage V1 and the voltage V2 are compared, and if the voltage V1 is higher, the first rectifier element 314 becomes conductive, and the power P1 from the first power source 60 becomes the output of the power source selection circuit 331. Conversely, if the voltage V1 is lower than the voltage V2, the second rectifier elements 330a and 330b become conductive, and the power P2 from the first external data line 50a becomes the output of the power source selection circuit 331.

In general, since a cable of a power source wiring is thicker than a core wire of a data line, a wiring resistance is low and power transmission efficiency of the power source is high. Therefore, in a case where supply of power from the power source (here, the first power source 60) is preferentially selected in a normal state, it is possible to reduce a loss of the power feed path, and thus, it is desirable to set the voltage in such a way that V1>V2. Therefore, more second rectifier elements 330a and 330b than the first rectifier element 314 in the power supply path (first power supply path 317) from the first power source 60 are inserted in series to the power supply path (second power supply path 324) from the first external data line 50a. As a result, the second rectifier elements 330a and 330b normally ensure a relationship of V1>V2 due to a voltage drop occurring at a PN junction. If the voltage V1 decreases due to an abnormality of the first power source 60 or the like, and V1<V2, the output of the power source selection circuit 331 is seamlessly switched to the power P2 from the first external data line 50a without an external signal, and continuous operation becomes possible.

B-1-2-4. First External Data Line 50a and Second External Data Line 50b

As the external data lines 50a and 50b arranged between the ECUs 20, 30, and 40, a radio frequency cable such as an impedance-matched coaxial or differential pair is used. The radio frequency cable is basically two wirings, and power source signals of the power source (+) and the power source (−) are superimposed on the two wirings. In particular, in order to reduce the number of cables in the vehicle, bidirectional data communication is performed by a pair of cables such as an unshielded twist pair (UTP), a shielded twist pair (STP), or a shielded parallel pair (SPP). On the other hand, a power source signal that can be superimposed by a pair of cables is unidirectional. Therefore, in the second embodiment, power is supplied from the integrated ECU 20 having a power transmission function to the area ECU 30 having a power reception function.

In FIG. 3, the first external data line 50a is simply indicated by two lines, but may be implemented by three or more wirings. Then, a power source signal can be superimposed on one or more of the wirings. The number of first data terminals 301 and the number of first internal data lines 302a also correspond to the number of wirings.

Since the external data lines 50a and 50b are impedance-matched cables for data communication, the thickness of the core wire is limited. Therefore, the wiring resistance increases, and there is a possibility of an increase in power transmission loss of the power source signal. In general, in a case where the same power source signal is transmitted, the power transmission loss is decreased by increasing a voltage and decreasing a current. Meanwhile, as for the data processing circuits 200 and 300, as a communication speed increases, semiconductors driven at a power source voltage of 5 V or less are becoming the mainstream. Therefore, the DC/DC converter 316 is provided between the output of the power source selection circuit 331 and the data processing circuit 300. With this configuration, a voltage of a power source superimposed on the first external data line 50a is set to a voltage higher than a power source voltage of the data processing circuit 300, such as 12 V, 24 V, 36 V, or 48 V, thereby suppressing an increase in power transmission loss.

B-2. Effects of Second Embodiment

According to the second embodiment, switching between power supply (first power supply path 317) from the first power source 60 to the data processing circuit 300 and power supply (second power supply path 324) from the integrated ECU 20 (another electronic control device) to the data processing circuit 300 is performed (FIGS. 3 and 6). In addition, power supply from the integrated ECU 20 to the data processing circuit 300 is performed by using the first external data line 50a for data communication between the area ECU 30 and the integrated ECU 20 as the second external power line (FIG. 3). Therefore, as compared with a case where an external power line is provided separately from the first external data line 50a, it is possible to ensure redundancy of power supply to the data processing circuit 300 while suppressing the number of external power lines.

In the second embodiment, the power source selection circuit 331 selects any one with a higher supply voltage for the data processing circuit 300 from the first power supply path 317 and the second power supply path 324 (FIGS. 3 and 6). As a result, switching between the first power supply path 317 or the second power supply path 324 can be automatically performed according to the supply voltage.

In the second embodiment, the power source selection circuit 331 includes the first rectifier element 314 (first voltage drop portion) between the power source terminal 305 and the coupling portion 321 (first power line coupling portion) and the second rectifier elements 330a and 330b (second voltage drop portion) between the first data terminal 301a and the coupling portion 321 (FIGS. 3 and 6). In addition, the voltage drop of the second rectifier elements 330a and 330b is larger than that of the first rectifier element 314. As a result, when a supply voltage from the first power source 60 is equal to a supply voltage from the integrated ECU 20, the first power supply path 317 is prioritized for power supply to the data processing circuit 300. Therefore, power supply using the first external data line 50a can be used supplementarily.

In the second embodiment, the first rectifier element 314 (first voltage drop portion) and the second rectifier elements 330a and 330b (second voltage drop portion) are of the same specification. In addition, the number of second rectifier elements 330a and 330b is larger than the number of first rectifier elements 314 (FIG. 3). This makes it possible to easily implement a state in which the second voltage drop portion has a larger voltage drop than the first voltage drop portion.

In the second embodiment, the total number of dedicated power source wirings is three, that is, two for the integrated ECU 20 and one for the area ECU 30. On the other hand, in a case where two dedicated power source wirings are connected to each ECU, the number of dedicated power source wirings is 2×2, which is four in total. As described above, in the second embodiment, the total number of dedicated power source wirings can be decreased.

C. Third Embodiment

C-1. Configuration

C-1-1. Overall Configuration

Figure 7:
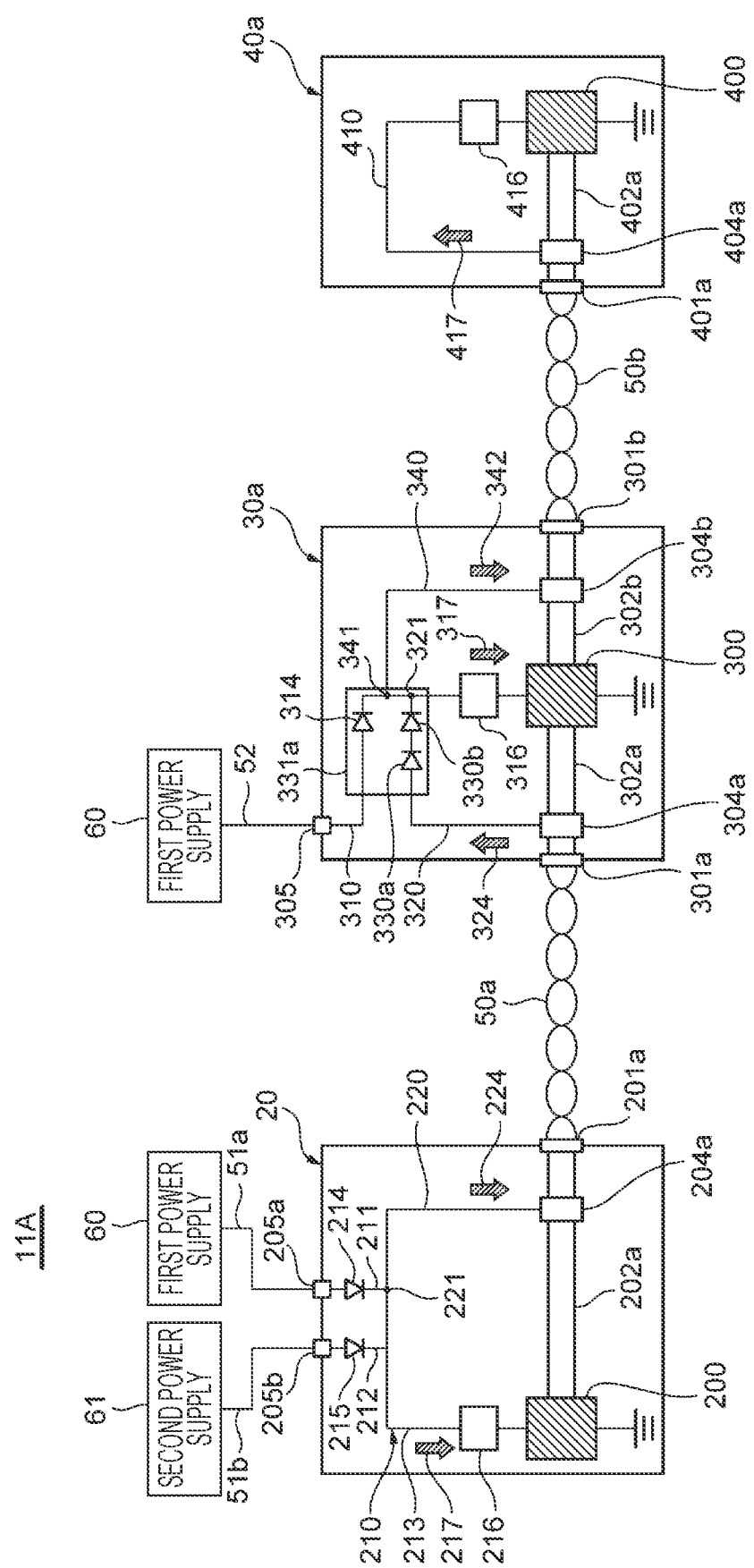
FIG. 7 is a diagram illustrating a configuration of a part of an electronic control system according to a third embodiment.

FIG. 7 is a diagram illustrating a configuration of a part of an electronic control system 11A according to a third embodiment. An overall configuration of the electronic control system 11A according to the third embodiment is similar to that of the electronic control system 11 (FIG. 1) of the second embodiment. That is, the electronic control system 11A according to the third embodiment includes an integrated electronic control device 20 (integrated ECU 20), an area electronic control device 30a (hereinafter, referred to as "area ECU 30a"), and a terminal electronic control device 40a (hereinafter, also referred to as "terminal ECU 40a") (see FIG. 7). Hereinafter, among constituent elements of the third embodiment, components equivalent to those of the second embodiment are denoted by the same reference signs, and a detailed description thereof will be omitted.

In the second embodiment, power can be supplied from the integrated ECU 20 to the area ECU 30 (FIG. 3). On the other hand, in the third embodiment, power can be supplied from the integrated ECU 20 to the area ECU 30a, and power can be supplied from the area ECU 30a to the terminal ECU (third electronic control device) 40a (FIG. 7). Therefore, in the third embodiment, power supply to the terminal ECU 40a is enabled without adding a new wiring to both the area ECU 30a and the terminal ECU 40a connected by a second external data line 50b.

C-1-2. Configuration of Each ECU

C-1-2-1. Outline

FIG. 7 illustrates three ECUs, that is, the integrated ECU 20, the area ECU 30a, and the terminal ECU 40a. As illustrated in FIG. 7, the integrated ECU 20 receives power from a first power source 60 and a second power source 61. In addition, power is supplied from the first power source 60 to the area ECU 30a. Furthermore, power from the first power source 60 or the second power source 61 supplied to the integrated ECU 20 is supplied to the area ECU 30a via a first external data line 50a (power source redundancy).

Furthermore, power from the first power source 60 supplied to the area ECU 30a or power supplied from the integrated ECU 20 to the area ECU 30a is supplied to the terminal ECU 40a via the second external data line 50b (power source redundancy).

The integrated ECU 20, the area ECU 30a, and the terminal ECU 40a include data processing circuits 200, 300, and 400, respectively, the data processing circuits 200, 300, and 400 executing data processing according to respective functions. The data processing circuits 200 and 300 of the integrated ECU 20 and the area ECU 30a perform data communication with each other through the first external data line 50a. The data processing circuits 300 and 400 of the area ECU 30a and the terminal ECU 40a perform data communication with each other through the second external data line 50b. The first external data line 50a and the second external data line 50b can be the same as or different from each other.

C-1-2-2. Integrated ECU 20

The integrated ECU 20 of the third embodiment is similar to the integrated ECU 20 of the second embodiment.

C-1-2-3. Area ECU 30a

The area ECU 30a of the third embodiment is similar to the area ECU 30 of the second embodiment in the following points. That is, the data processing circuit 300 of the area ECU 30a of the third embodiment performs data communication with the data processing circuit 200 of the integrated ECU 20 via the first external data line 50a. In the area ECU 30a of the third embodiment, power from the first power source 60 is supplied to the data processing circuit 300 via a first power supply path 317. In addition, power of the integrated ECU 20 is supplied to the area ECU 30a via the first external data line 50a (or superimposed on the first external data line 50a).

Meanwhile, the area ECU 30a of the third embodiment is different from the area ECU 30 of the second embodiment in the following points. That is, in the second embodiment (FIG. 3), a description of a configuration in which the data processing circuit 300 of the area ECU 30 and the data processing circuit of the terminal ECU 40 perform data communication is omitted (such data communication is performed in actual implementation). On the other hand, the third embodiment (FIG. 7) specifically shows a configuration in which the data processing circuit 300 of the area ECU 30a performs data communication with the data processing circuit (third data processing circuit) 400 of the terminal ECU 40a via the second external data line 50b. More specifically, the data processing circuit 300 of the area ECU 30a transmits and receives a signal to and from the data processing circuit 400 of the terminal ECU 40a via a second internal data line 302b, a second data input/output terminal 301b (hereinafter, also referred to as "second data terminal 301b"), and the second external data line 50b. A data signal output from the data processing circuit 300 is output to the second external data line 50b via a high-pass filter 308 (FIG. 4) of a filter circuit 304b.

Further, power of the area ECU 30a is supplied to the terminal ECU 40a via the second external data line 50b (or superimposed on the second external data line 50b). A third internal power line 340 is connected to a first internal power line 310 of the area ECU 30a. The third internal power line 340 connects a coupling portion 341 for the first internal power line 310 and the filter circuit 304b. As a result, power from the first power supply path 317 (first power source 60) or a second power supply path 324 (integrated ECU 20) is also supplied to the filter circuit 304b. Similarly to the filter circuit 304a, the filter circuit 304b includes the high-pass filter 308 and a low-pass filter 309 (FIG. 4).

The power supplied to the filter circuit 304b is output to the second internal data line 302b via the low-pass filter 309 (FIG. 4) of the filter circuit 304b, superimposed on a data signal, and then output to the terminal ECU 40a via the second external data line 50b. Hereinafter, a power supply path formed by the third internal power line 340, the filter circuit 304b, the second internal data line 302b, and the second data terminal 301b is referred to as a third power supply path 342.

C-1-2-4. Terminal ECU 40a

The terminal ECU 40a is provided with a plurality of first data input/output terminals 401a (hereinafter, also referred to as "first data terminals 401a") to which the second external data line 50b is connected, and a plurality of first internal data lines 402a connecting the first data terminals 401a and the data processing circuit 400. A filter circuit 404a is provided on the first internal data line 402a. The data processing circuit 400 of the terminal ECU 40a transmits and receives a signal to and from the data processing circuit 300 of the area ECU 30a via the first internal data line 402a, the first data terminal 401a, and the second external data line 50b.

The terminal ECU 40a includes a first internal power line 410 that connects the filter circuit 404a and the data processing circuit 400. A power source signal transmitted via the second external data line 50b is extracted by a low-pass filter (not illustrated) of the filter circuit 404a and transmitted to the data processing circuit 400 via the first internal power line 410. A step-down DC/DC converter 416 is disposed on the first internal power line 410. Depending on specifications of the terminal ECU 40a, the DC/DC converter 416 may be a step-up/step-down converter or a step-up converter. Hereinafter, a power supply path formed by the first data terminal 401a, a portion of the first internal data line 402a (a portion from the first data terminal 401a to the filter circuit 404a), and the first internal power line 410 is referred to as a first power supply path 417.

In the third embodiment, since power consumption of the terminal ECU 40a is 10 W or less, which is lower than those of the area ECU 30a and the integrated ECU 20, power is supplied only by power source redundancy. However, the terminal ECU 40a may also be configured to use a power source selection circuit for direct connection to a power source and indirect power supply from an external data line.

C-1-2-5. First External Data Line 50a and Second External Data Line 50b

The first external data line 50a and the second external data line 50b of the third embodiment are similar to the first external data line 50a and the second external data line 50b of the second embodiment.

C-2. Effects of Third Embodiment

According to the third embodiment as described above, the following effects can be obtained in addition to or instead of the effects of the second embodiment.

In the third embodiment, the area ECU 30a (electronic control device) includes the second data terminal 301b to which the second external data line 50b for performing data communication with the terminal ECU 40a (another second electronic control device) is connected, the second internal data line 302b that connects the second data terminal 301b and the data processing circuit 300, and the third internal power line 340 that is connected to the first internal power line 310 by the coupling portion 341 (second power line coupling portion) and connects the second internal data line 302b and the first internal power line 310 (FIG. 7). In addition, a combination of the third internal power line 340, the second internal data line 302b, and the second data terminal 301b forms the third power supply path 342 that supplies power of the area ECU 30a to the terminal ECU 40a. Further, a power source selection circuit 331a selects the first power supply path 317 or the second power supply path 324 and enables power supply to the terminal ECU 40a via the third power supply path 342 (FIG. 7). As a result, power from the first power source 60 or the integrated ECU 20 (another electronic control device) can also be supplied to the terminal ECU 40a.

In the third embodiment, the total number of dedicated power source wirings is three, that is, two for the integrated ECU 20, one for the area ECU 30a, and zero for the terminal ECU 40a (FIG. 7). On the other hand, in a case where two power source wirings are connected to each ECU, the number of power source wirings is 3×2, which is six in total. Therefore, in the third embodiment, the total number of power source wirings can be decreased.

D. Fourth Embodiment

D-1. Configuration

D-1-1. Overall Configuration

Figure 8:
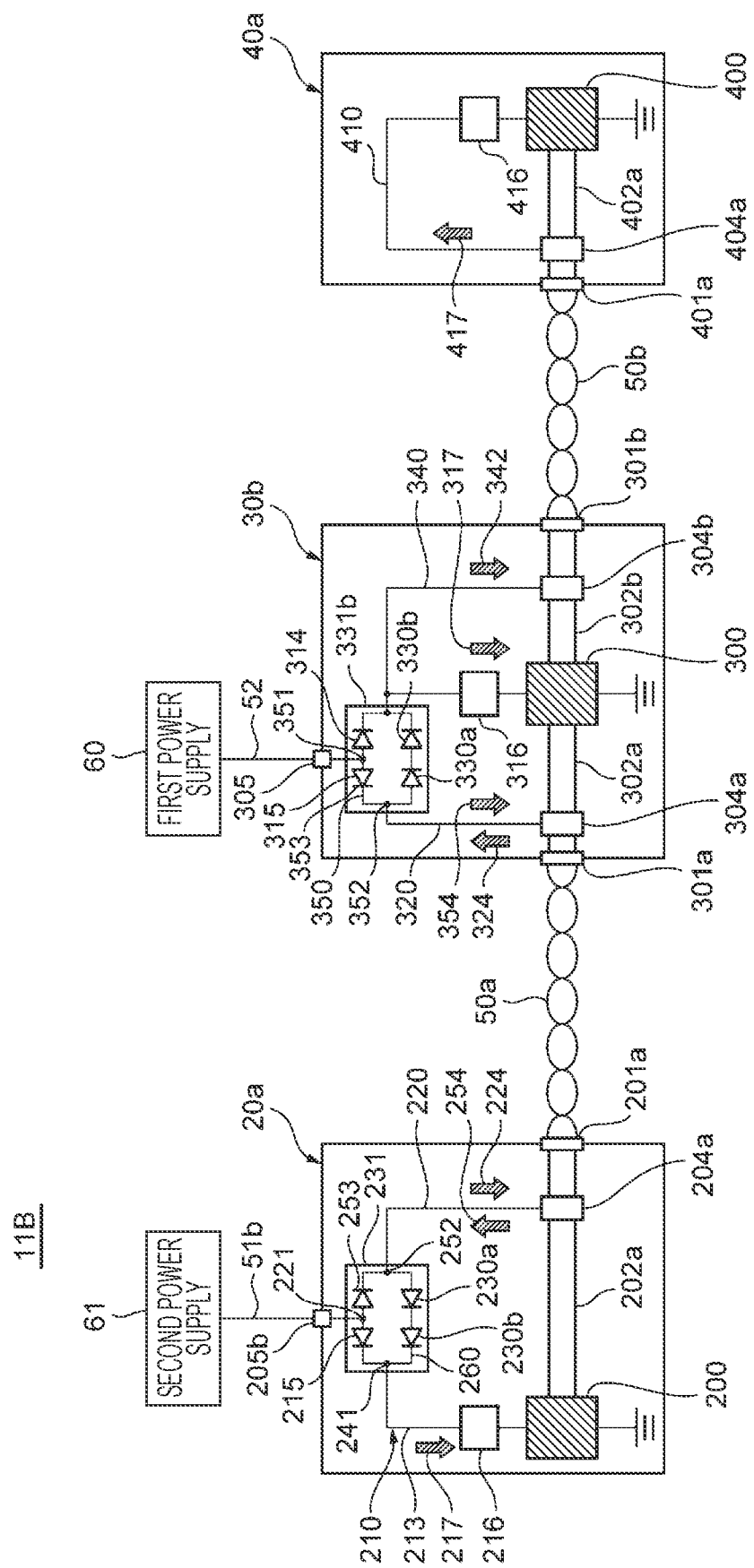
FIG. 8 is a diagram illustrating a configuration of a part of an electronic control system according to a fourth embodiment.

FIG. 8 is a diagram illustrating a configuration of a part of an electronic control system 11B according to a fourth embodiment. An overall configuration of the electronic control system 11B according to the fourth embodiment is similar to those of the electronic control system 11 (FIG. 1) of the second embodiment and the electronic control system 11A of the third embodiment. That is, the electronic control system 11B according to the fourth embodiment includes an integrated electronic control device 20a (hereinafter, referred to as "integrated ECU 20a"), an area electronic control device 30b (hereinafter, referred to as "area ECU 30b"), and a terminal electronic control device 40a (terminal ECU 40a) (FIG. 8). Hereinafter, among constituent elements of the fourth embodiment, components equivalent to those of the second and third embodiments are denoted by the same reference signs, and a detailed description thereof will be omitted.

In the third embodiment, power can be supplied from the integrated ECU 20 to the area ECU 30a, and power can be supplied from the area ECU 30a to the terminal ECU 40a (FIG. 7). On the other hand, in the fourth embodiment, power can be supplied from the integrated ECU 20a to the area ECU 30b, power can be supplied from the area ECU 30b to the terminal ECU 40a, and power can be supplied from the area ECU 30b to the integrated ECU 20a (FIG. 8).

In other words, in the third embodiment, since a power source signal that can be superimposed by a pair of cables used in an in-vehicle network is unidirectional, the ECU (integrated ECU 20) that transmits power and the ECU (area ECU 30a) that receives power are determined in one-to-one communication between the ECUs. Therefore, redundancy can be achieved for the ECU that receives power, but redundancy cannot be achieved for the ECU that transmits power. In the fourth embodiment, a power transmission direction of a power source signal is not determined, and the power transmission direction can be changed according to a situation.

In addition, in the fourth embodiment, power source redundancy is enabled without adding a new cable to both the integrated ECU 20a and the area ECU 30b connected by a first external data line 50a. First, the integrated ECU 20a and the area ECU 30b receive power from different power sources, respectively. That is, power is supplied from a second power source 61 to the integrated ECU 20a, and power is supplied from a first power source 60 to the area ECU 30b (FIG. 8). These power sources are power sources for a normal state, and the integrated ECU 20a and the area ECU 30b function as redundant power sources for each other.

D-1-2. Configuration of Each ECU

D-1-2-1. Outline

FIG. 8 illustrates three ECUs, that is, the integrated ECU 20a, the area ECU 30b, and the terminal ECU 40a. As illustrated in FIG. 8, the integrated ECU 20a receives power from the second power source 61 via a second power source line 51b. In addition, power is supplied from the first power source 60 to the area ECU 30b via a first power source line 52. Furthermore, the integrated ECU 20a receives power supplied from the first power source 60 to the area ECU 30b via the first external data line 50a (power source redundancy). Power supplied from the second power source 61 to the integrated ECU 20a is supplied to the area ECU 30b via the first external data line 50a (power source redundancy). Furthermore, power supplied from the first power source 60 to the area ECU 30b or power supplied from the integrated ECU 20a to the area ECU 30b is supplied to the terminal ECU 40a via a second external data line 50b (power source redundancy). Hereinafter, a description will be given focusing on a configuration for supplying power from the area ECU 30b to the integrated ECU 20a. Therefore, the area ECU 30b will be described first, and then the integrated ECU 20a will be described.

D-1-2-2. Area ECU 30b

The area ECU 30b of the fourth embodiment is similar to the area ECU 30a of the third embodiment in the following points. That is, a data processing circuit 300 of the area ECU 30b of the fourth embodiment performs data communication with a data processing circuit 200 of the integrated ECU 20a via the first external data line 50a. In the area ECU 30b of the fourth embodiment, power from the first power source 60 is supplied to the data processing circuit 300 via a first power supply path 317. In addition, power of the integrated ECU 20a is supplied to the area ECU 30b via the first external data line 50a (or superimposed on the first external data line 50a). The data processing circuit 300 of the area ECU 30b of the fourth embodiment performs data communication with a data processing circuit 400 of the terminal ECU 40a via the second external data line 50b. Power of the area ECU 30b is supplied to the terminal ECU 40a via the second external data line 50b (or superimposed on the second external data line 50b).

Meanwhile, the area ECU 30b of the fourth embodiment is different from the area ECU 30a of the third embodiment in the following points. That is, power of the area ECU 30b of the fourth embodiment is supplied to the integrated ECU 20a via the first external data line 50a (or superimposed on the first external data line 50a). A fourth internal power line 350 is connected to a first internal power line 310 and a second internal power line 320 of the area ECU 30b. The fourth internal power line 350 connects a coupling portion 351 for the first internal power line 310 and a coupling portion 352 for the second internal power line 320. The coupling portion 351 is disposed closer to a power source terminal 305 (filter circuit 304a) than a first rectifier element 314 of the first internal power line 310. The coupling portion 352 is disposed closer to a first data terminal 301a than a second rectifier elements 330a and 330b. Further, a third rectifier element 353 such as a diode is disposed on the fourth internal power line 350.

As a result, power from the first power source 60 for the area ECU 30b can be supplied to the filter circuit 304a via the power source terminal 305, the first internal power line 310, the fourth internal power line 350, and the second internal power line 320. The power supplied to the filter circuit 304a can be output to a first internal data line 302a via a low-pass filter 309 (FIG. 4) of the filter circuit 304a, superimposed on a data signal, and then output to the integrated ECU 20a via the first external data line 50a. Hereinafter, a power supply path formed by the fourth internal power line 350, the second internal power line 320, the filter circuit 304a, the first internal data line 302a, and the first data terminal 301a is referred to as a fourth power supply path 354.

The first rectifier element 314, the second rectifier elements 330a and 330b, and the third rectifier element 353 are included in a power source selection circuit 331b. The first rectifier element 314, the second rectifier elements 330a and 330b, and the third rectifier element 353 can be of the same specification, and may also be of different specifications. The power source selection circuit 331b selects one of the first power supply path 317 and a second power supply path 324 to supply power to the data processing circuit 300. In the fourth embodiment, the power source selection circuit 331b selects any one with a higher supply voltage for the data processing circuit 300 from the first power supply path 317 and the second power supply path 324.

Figure 9:
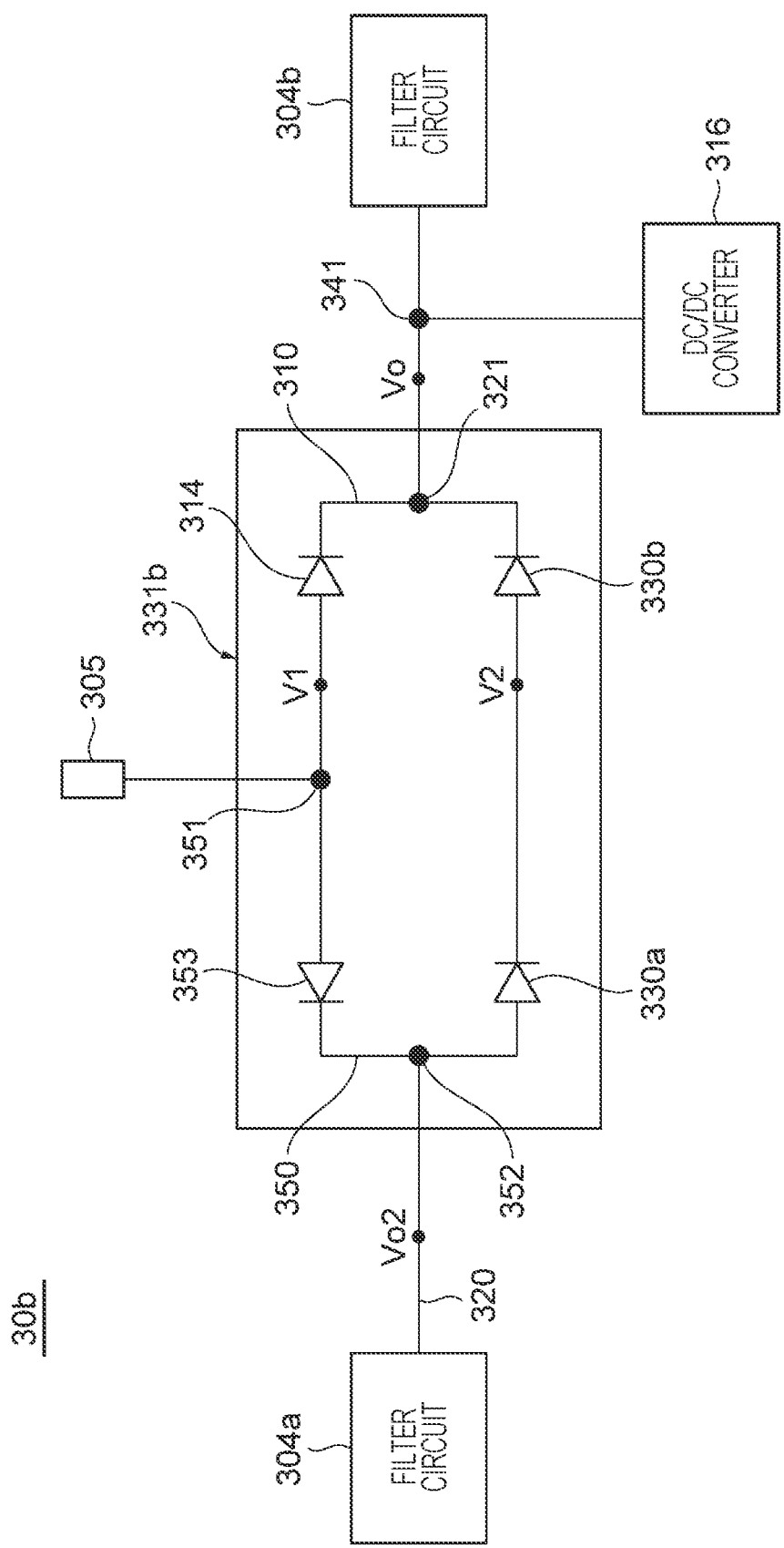
FIG. 9 is a diagram illustrating a configuration of a power source selection circuit of an area electronic control device according to the fourth embodiment.

FIG. 9 is a diagram illustrating a configuration of the power source selection circuit 331b of the area ECU 30b according to the fourth embodiment. The power source selection circuit 331b of the fourth embodiment includes the third rectifier element 353 in addition to the configuration (the first rectifier element 314 and the second rectifier elements 330a and 330b) of the power source selection circuit 331 of the second embodiment (FIG. 6). The third rectifier element 353 causes power from the first power source 60 to flow toward the filter circuit 304a (first data terminal 301a) (that is, toward the integrated ECU 20).

The functions of the first rectifier element 314 and the second rectifier elements 330a and 330b are similar to those of the second embodiment. That is, in a normal state of the area ECU 30b according to the fourth embodiment, since an output voltage of the first rectifier element 314 (or a voltage V1 before the first rectifier element 314) is higher than an output voltage of the second rectifier element 330b closest to a coupling portion 321 (or a voltage V2 before the second rectifier element 330b) (V1>V2), an output voltage Vo on the coupling portion 321 side is equal to the output voltage of the first rectifier element 314. As a result, power from the first power source 60 is supplied to the data processing circuit 300 via the first power supply path 317.

In addition, in a case where the output voltage of the first rectifier element 314 (or the voltage V1 before the first rectifier element 314) is lower than the output voltage of the second rectifier element 330b closest to the coupling portion 321 (or the voltage V2 before the second rectifier element 330b) (V1<V2) due to an abnormality of the first power source 60 or the like, the output voltage Vo on the coupling portion 321 side is equal to the output voltage of the second rectifier element 330b. As a result, power from the integrated ECU 20a is supplied to the data processing circuit 300 via the second power supply path 324. Therefore, redundancy of power supply to the data processing circuit 300 can be implemented.

Furthermore, in the fourth embodiment, it is possible to supply power from the integrated ECU 20a to the area ECU 30b via the first external data line 50a and to supply power from the area ECU 30b to the integrated ECU 20a via the first external data line 50a. That is, in a case where an output voltage of the third rectifier element 353 (or the voltage V1 before the third rectifier element 353) is higher than an output voltage from the first data terminal 301a (an output voltage of the integrated ECU 20a), a voltage Vo2 on the second internal power line 320 approximates to the voltage V1 (to be precise, to a value obtained by subtracting a voltage drop of the third rectifier element 353 from the voltage V1). On the other hand, in a case where the output voltage of the third rectifier element 353 (or the voltage V1 before the third rectifier element 353) is lower than the output voltage from the first data terminal 301a, the voltage Vo2 on the second internal power line 320 becomes the output voltage from the first data terminal 301a.

D-1-2-3. Integrated ECU 20a

The integrated ECU 20a of the fourth embodiment is similar to the integrated ECUs 20 of the second and third embodiments in the following points. That is, the data processing circuit 200 of the integrated ECU 20a of the fourth embodiment performs data communication with the data processing circuit 300 of the area ECU 30b via the first external data line 50a. In addition, power of the integrated ECU 20a is supplied to the area ECU 30b via a second internal power line 220 and the first external data line 50a (or superimposed on the first external data line 50a).

On the other hand, the integrated ECU 20a of the fourth embodiment is different from the integrated ECUs 20 of the second and third embodiments in the following points. That is, the second internal power lines 220 of the integrated ECUs 20 of the second and third embodiments are used only for supplying power from the integrated ECU 20 to the area ECUs 30 and 30a, respectively. On the other hand, the second internal power line 220 of the integrated ECU 20a of the fourth embodiment is used for both power supply from the integrated ECU 20a to the area ECU 30b and power supply from the area ECU 30b to the integrated ECU 20a.

Since the second internal power line 220 is used for both power supply from the integrated ECU 20a to the area ECU 30b and power supply from the area ECU 30b to the integrated ECU 20a, a third rectifier element 253 is disposed on the second internal power line 220.

The integrated ECU 20a is provided with a third internal power line 260. The third internal power line 260 branches off from the second internal power line 220 at a coupling portion 252 closer to the first external data line 50a than the third rectifier element 253, and is connected to a first internal power line 210 at a coupling portion 241 closer to the data processing circuit 200 than a first rectifier element 215.

Further, second rectifier elements 230a and 230b are provided on the third internal power line 260 to prevent backflow toward a power source terminal 205b.

Therefore, in a case where a power source signal (superimposed signal) is transmitted from the area ECU 30b to the integrated ECU 20a via the first external data line 50a, the power source signal is extracted or separated by a low-pass filter 209 (FIG. 4) of a filter circuit 204a. The extracted or separated power source signal can pass through the second internal power line 220 to reach the coupling portion 252, then pass through the third internal power line 260 to reach the coupling portion 241, and then pass through the first internal power line 210 and a DC/DC converter 216 to be supplied to the data processing circuit 200. Hereinafter, a power supply path including a first data terminal 201a, a first internal data line 202a, and the second internal power line 220 is referred to as a third power supply path 254.

The first rectifier element 215, the second rectifier elements 230a and 230b, and the third rectifier element 253 are included in a power source selection circuit 231. The first rectifier element 215, the second rectifier elements 230a and 230b, and the third rectifier element 253 can be of the same specification, and may also be of different specifications. The power source selection circuit 231 of the integrated ECU 20a has the same configuration as the power source selection circuit 331b of the area ECU 30b. The power source selection circuit 231 selects any one of power from the second power source 61 (first power supply path 217) and power from the area ECU 30b (third power supply path 254) to supply power to the data processing circuit 200. In the fourth embodiment, the power source selection circuit 231 selects any one with a higher supply voltage for the data processing circuit 200 from the first power supply path 217 and the third power supply path 254.

D-1-2-4. Terminal ECU 40a

The terminal ECU 40a of the fourth embodiment is similar to the terminal ECU 40a (FIG. 6) of the third embodiment.

D-1-2-5. First External Data Line 50a and Second External Data Line 50b

The first external data line 50a and the second external data line 50b of the fourth embodiment are similar to the first external data line 50a and the second external data line 50b of the third embodiment.

D-2. Effects of Fourth Embodiment

According to the fourth embodiment as described above, the following effects can be obtained in addition to or instead of the effects of the second embodiment or the third embodiment.

In the fourth embodiment, the area ECU 30b (electronic control device) includes the first rectifier element 314 that is disposed closer to the power source terminal 305 than the coupling portion 321 (first power line coupling portion) on the first internal power line 310 and passes a current from the power source terminal 305 to the data processing circuit 300, the second rectifier elements 330a and 330b that are disposed on the second internal power line 320 and pass a current from the first data terminal 301a to the coupling portion 321, and the fourth internal power line 350 that is connected to the first internal power line 310 by a coupling portion 351 (third power line coupling portion) and is connected to the second internal power line 320 by a coupling portion 352 (fourth power line coupling portion) to connect the first internal power line 310 and the second internal power line 320 (FIGS. 8 and 9).

The coupling portion 351 is positioned closer to the power source terminal 305 than the coupling portion 321 (first power line coupling portion) on the first internal power line 310 (FIGS. 8 and 9). The coupling portion 352 is positioned closer to the first data terminal 301a than the second rectifier elements 330a and 330b on the second internal power line 320 (FIGS. 8 and 9). The area ECU 30b further includes the third rectifier element 353 that is disposed on the fourth internal power line 350 and passes a current from the coupling portion 351 to the coupling portion 352 (FIGS. 8 and 9).

As a result, power from the integrated ECU 20a (another first electronic control device) can be supplied to the area ECU 30b via the first data terminal 301a, and power from the area ECU 30b (or the first power source 60) can be supplied to the integrated ECU 20a via the first data terminal 301a.

E. Fifth Embodiment

E-1. Configuration

E-1-1. Overall Configuration

Figure 10:
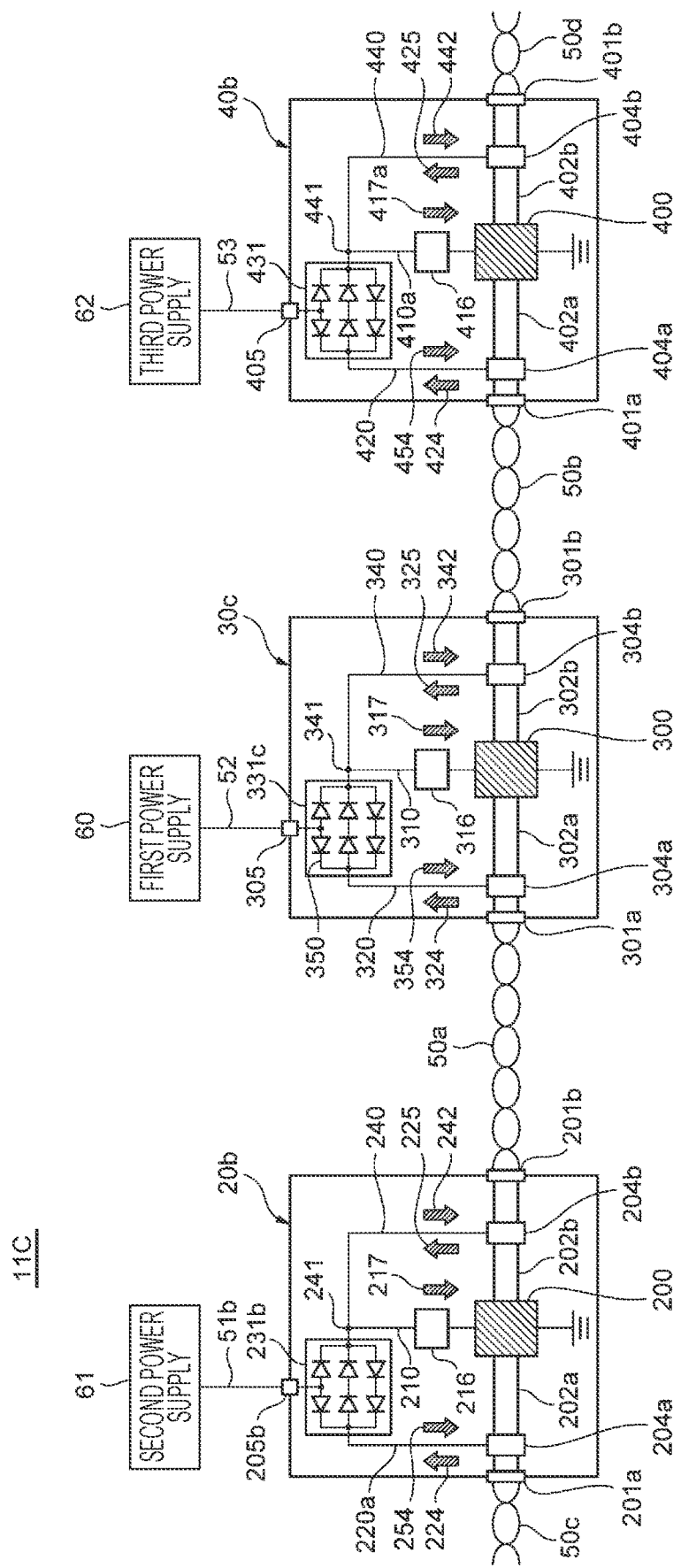
FIG. 10 is a diagram illustrating a configuration of a part of an electronic control system according to a fifth embodiment.

FIG. 10 is a diagram illustrating a configuration of a part of an electronic control system 11C according to a fifth embodiment. An overall configuration of the electronic control system 11C according to the fifth embodiment is similar to the electronic control system 11 (FIG. 3) of the second embodiment and the electronic control systems 11A and 11b of the third and fourth embodiments. That is, the electronic control system 11C according to the fifth embodiment includes an integrated electronic control device 20b (hereinafter, referred to as "integrated ECU 20b"), an area electronic control device 30c (hereinafter, referred to as "area ECU 30c"), and a terminal electronic control device 40b (hereinafter, referred to as "terminal ECU 40b") (FIG. 10). However, in the fifth embodiment, a third power source 62 (FIG. 10) is also provided. As the third power source 62, a power source with the same specification as the first power source 60 and the second power source 61 or a power source with a different standard from the first power source 60 and the second power source 61 can be used. Hereinafter, among constituent elements of the fifth embodiment, components equivalent to those of the first to fourth embodiments are denoted by the same reference signs, and a detailed description thereof will be omitted.

The fifth embodiment is an extended version of the fourth embodiment. That is, in the fourth embodiment, power can be supplied from the integrated ECU 20a to the area ECU 30b, power can be supplied from the area ECU 30b to the terminal ECU 40a, and power can be supplied from the area ECU 30b to the integrated ECU 20a (FIG. 8). However, in the fourth embodiment, power cannot be supplied from the terminal ECU 40a to the integrated ECU 20a or the area ECU 30b. On the other hand, in the fifth embodiment, the integrated ECU 20b, the area ECU 30c, and the terminal ECU 40b can mutually supply power.

E-1-2. Configuration of Each ECU

E-1-2-1. Outline

Although FIG. 10 illustrates three ECUs, that is, the integrated ECU 20b, the area ECU 30c, and the terminal ECU 40*b*, the integrated ECU 20*b* is connected to a fourth ECU (not illustrated) via a third external data line 50*c*, and the terminal ECU 40*b* is connected to a fifth ECU (not illustrated) via a fourth external data line 50*d*. In other words, an in-vehicle network system of the fifth embodiment has a wider application range even in a network configuration in which connection is made in multiple stages like a daisy chain network.

As illustrated in FIG. 10, the integrated ECU 20*b* receives power from the second power source 61 via a power source line 51*b*. In addition, power is supplied from the first power source 60 to the area ECU 30*c* via a power source line 52. Furthermore, power is supplied from the third power source 62 to the terminal ECU 40*b* via a power source line 53. The second power source 61 for the integrated ECU 20*b*, the first power source 60 for the area ECU 30*c*, and the third power source 62 for the terminal ECU 40*b* are power sources for a normal state.

In addition, each ECU can receive power from another ECU via the external data lines 50*a* to 50*d*. In other words, each ECU uses another ECU as a redundant power source. Specifically, power from the area ECU 30*c* is supplied to the integrated ECU 20*b* via the first external data line 50*a*, and power from the fourth ECU is supplied to the integrated ECU 20*b* via the third external data line 50*c*. Power from the integrated ECU 20*b* is supplied to the area ECU 30*c* via the first external data line 50*a*, and power from the terminal ECU 40*b* is supplied to the area ECU 30*c* via the second external data line 50*b*. Power from the area ECU 30*c* is supplied to the terminal ECU 40*b* via the second external data line 50*b*, and power from the fifth ECU is supplied to the terminal ECU 40*b* via the fourth external data line 50*d*. In the following description, a configuration of the area ECU 30*c* will be focused first. Thereafter, the integrated ECU 20*b* and the terminal ECU 40*b* will be described.

E-1-2-2. Area ECU 30*c*

Figure 11:
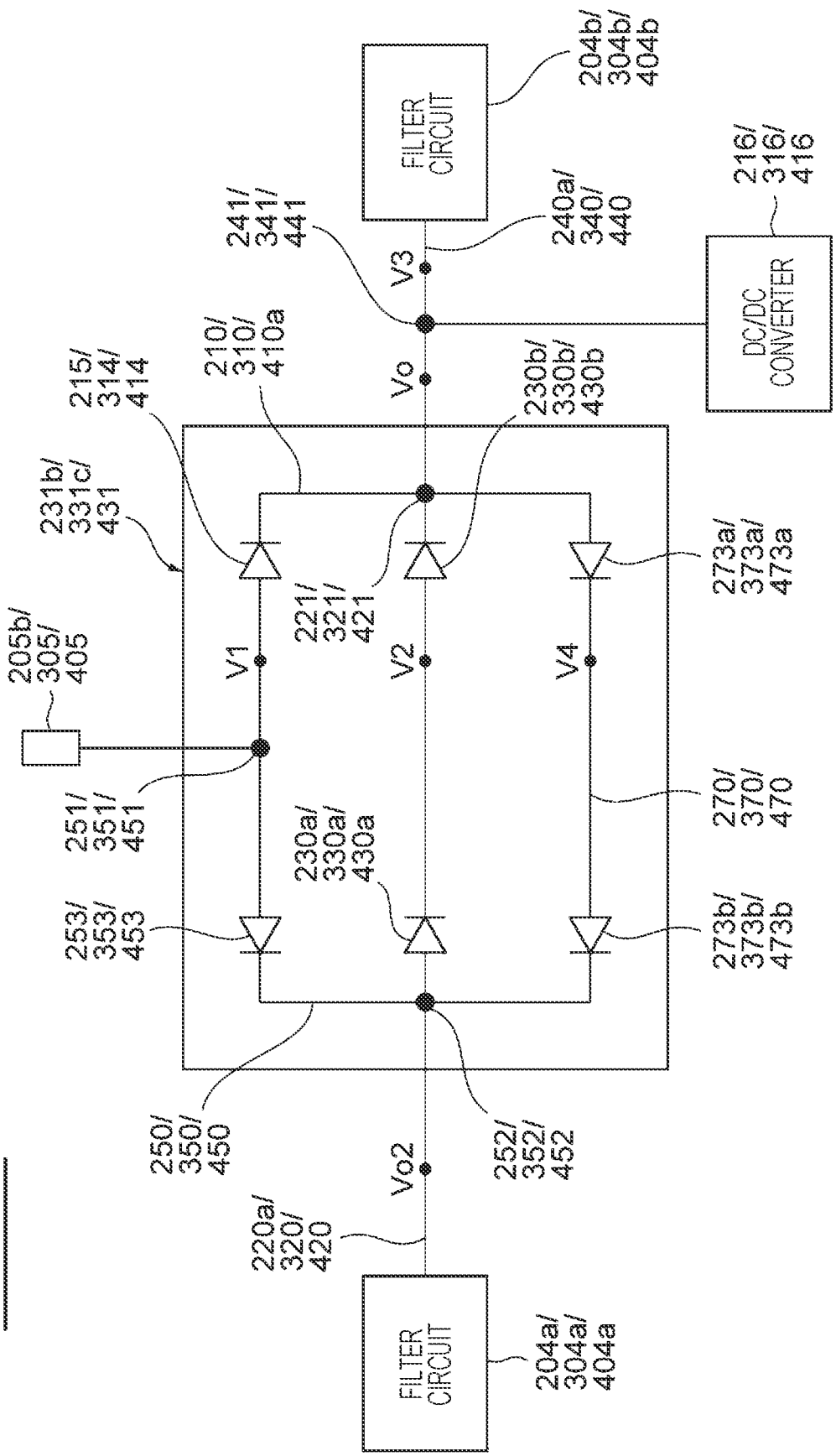
FIG. 11 is a diagram illustrating a configuration of a power source selection circuit of each electronic control device according to the fifth embodiment.

FIG. 11 is a diagram illustrating a configuration of power source selection circuits 231*b*, 331*c*, and 431 of the respective ECUs 20*b*, 30*c*, and 40*b* according to the fifth embodiment. In FIG. 11, reference signs indicate constituent elements of the power source selection circuits 231*b*, 331*c*, and 431, respectively.

The area ECU 30*c* of the fifth embodiment is similar to the area ECU 30*b* of the fourth embodiment in the following points. That is, a data processing circuit 300 of the area ECU 30*c* of the fifth embodiment performs data communication with a data processing circuit 200 of the integrated ECU 20*b* via the first external data line 50*a*. In the area ECU 30*c* of the fifth embodiment, power from the first power source 60 is supplied to the data processing circuit 300 via a first power supply path 317. Further, power of the integrated ECU 20*b* is supplied to the area ECU 30*c* via the first external data line 50*a* (or superimposed on the first external data line 50*a*). The data processing circuit 300 of the area ECU 30*c* of the fifth embodiment performs data communication with a data processing circuit 400 of the terminal ECU 40*b* via the second external data line 50*b*. Power of the area ECU 30*c* is supplied to the terminal ECU 40*b* via the second external data line 50*b* (or superimposed on the second external data line 50*b*). Power of the area ECU 30*c* of the fifth embodiment is supplied to the integrated ECU 20*b* via the first external data line 50*a* (or superimposed on the first external data line 50*a*).

Meanwhile, the area ECU 30*c* of the fifth embodiment is different from the area ECU 30*b* of the fourth embodiment in the following points. That is, power from the terminal ECU 40*b* is supplied to the area ECU 30*c* of the fifth embodiment via the second external data line 50*b* (or superimposed on the second external data line 50*b*).

Similarly to the area ECU 30*b* of the fourth embodiment, the area ECU 30*c* of the fifth embodiment includes a first internal power line 310, a second internal power line 320, a third internal power line 340, and a fourth internal power line 350 (FIG. 10). Therefore, power from the terminal ECU 40*b* (third power source 62) for the area ECU 30*c* can be supplied to the data processing circuit 300 via a second data terminal 301*b*, a second internal data line 302*b*, a filter circuit 304*b*, the third internal power line 340, and the first internal power line 310. Hereinafter, a power supply path formed by the second data terminal 301*b*, the second internal data line 302*b*, the filter circuit 304*b*, and the third internal power line 340 is referred to as a fifth power supply path 325.

As illustrated in FIG. 11, the area ECU 30*c* according to the fifth embodiment includes a fifth internal power line 370 that connects the first internal power line 310 and the second internal power line 320. The fifth internal power line 370 connects a coupling portion 321 between the first internal power line 310 and the second internal power line 320 and a coupling portion 352 between the second internal power line 320 and the fourth internal power line 350. The coupling portion 321 is disposed closer to the data processing circuit 300 than a first rectifier element 314 of the first internal power line 310. A coupling portion between the first internal power line 310 and the fifth internal power line 370 may be a portion other than the coupling portion 321. The coupling portion 352 is disposed closer to a filter circuit 304*a* (first data terminal 301*a*) than second rectifier elements 330*a* and 330*b*. A coupling portion between the second internal power line 320 and the fifth internal power line 370 may be a portion other than the coupling portion 352.

Fourth rectifier elements 373*a* and 373*b* such as diodes are disposed on the fifth internal power line 370. The fourth rectifier elements 373*a* and 373*b* supply power from the first power source 60 or the terminal ECU 40*b* toward the first data terminal 301*a* (that is, toward the integrated ECU 20*b*). As a result, power supplied from the terminal ECU 40*b* (third power source 62) to the area ECU 30*c* can also be supplied to the integrated ECU 20*b*. That is, power supplied from the terminal ECU 40*b* (third power source 62) to the area ECU 30*c* can be supplied to the filter circuit 304*a* via the second data terminal 301*b*, the second internal data line 302*b*, the filter circuit 304*b*, the third internal power line 340, the first internal power line 310, the fifth internal power line 370, and the second internal power line 320. The power supplied to the filter circuit 304*a* can be output to a first internal data line 302*a* via a low-pass filter 309 (FIG. 4) of the filter circuit 304*a*, superimposed on a data signal, and then output to the integrated ECU 20*b* via the first external data line 50*a*.

The first rectifier element 314, the second rectifier elements 330*a* and 330*b*, a third rectifier element 353, and the fourth rectifier elements 373*a* and 373*b* are included in the power source selection circuit 331*c*. The first rectifier element 314, the second rectifier elements 330*a* and 330*b*, the third rectifier element 353, and the fourth rectifier elements 373*a* and 373*b* can be of the same specification, and may also be of different specifications. The power source selection circuit 331*c* selects any one of the first power supply path 317, a second power supply path 324, and the fifth power supply path 325 to supply power to the data processing circuit 300. In the fourth embodiment, the power source selection circuit 331c selects any one with a higher supply voltage for the data processing circuit 300 from the first power supply path 317, the second power supply path 324, and the fifth power supply path 325.

The functions of the first rectifier element 314, the second rectifier elements 330a and 330b, and the third rectifier element 353 are similar to those of the first to fourth embodiments. However, in the fifth embodiment, power from the terminal ECU 40b can be supplied via the third internal power line 340. Therefore, power is supplied to the data processing circuit 300 by using a power path with the highest value among an output voltage of the first rectifier element 314 (a value obtained by subtracting a voltage drop of the first rectifier element 314 from a voltage V1), an output voltage of the second rectifier element 330b (a value obtained by subtracting a voltage drop of the second rectifier element 330b from a voltage V2), and an output voltage V3 of the third internal power line 340. As a result, redundancy of power supply to the data processing circuit 300 can be implemented.

In the area ECU 30c according to the fifth embodiment, the fifth internal power line 370 and the fourth rectifier elements 373a and 373b are provided (FIG. 11). Therefore, a power path with the highest value among an output voltage of the third rectifier element 353 (a value obtained by subtracting a voltage drop of the third rectifier element 353 from the voltage V1), an output voltage of the fourth rectifier element 373b (a value obtained by subtracting a voltage drop of the fourth rectifier element 373b from a voltage V4), and an output voltage from the first data terminal 301a (an output voltage from the integrated ECU 20b) is selected. That is, in a case where the output voltage of the third rectifier element 353 is the highest, power can be supplied from the area ECU 30c to the integrated ECU 20b via the third rectifier element 353. In a case where the output voltage of the fourth rectifier element 373b is the highest, power can be supplied from the area ECU 30c to the integrated ECU 20b via the fourth rectifier element 373b. In a case where the output voltage from the first data terminal 301a is the highest, power can be supplied from the integrated ECU 20b to the area ECU 30c. As a result, redundancy of power supply to the data processing circuits 200 and 300 can be implemented.

E-1-2-3. Integrated ECU 20b

Reference signs of the constituent elements of the integrated ECU 20b in FIG. 10 are changed for the area ECU 30c. The integrated ECU 20b of the fifth embodiment is similar to the integrated ECU 20a of the fourth embodiment in the following points. That is, the data processing circuit 200 of the integrated ECU 20b of the fifth embodiment performs data communication with the data processing circuit 300 of the area ECU 30c via the first external data line 50a. In addition, power of the integrated ECU 20b is supplied to the area ECU 30c via a third internal power line 240 and the first external data line 50a (or superimposed on the first external data line 50a). Furthermore, power of the area ECU 30c is supplied to the integrated ECU 20b via the first external data line 50a and the third internal power line 240 (or superimposed on the first external data line 50a).

On the other hand, the integrated ECU 20b of the fifth embodiment is different from the integrated ECU 20a of the fourth embodiment in the following points. That is, in the integrated ECU 20b of the fifth embodiment, power is transferred to and from the fourth ECU (not illustrated) disposed on the opposite side of the area ECU 30c.

As is clear from FIG. 10 (and FIG. 11), the integrated ECU 20b has the same configuration as that of the area ECU 30c. That is, the integrated ECU 20b includes a first internal power line 210, a second internal power line 220a, the third internal power line 240, a fourth internal power line 250, and a fifth internal power line 270.

A first rectifier element 215 is disposed on the first internal power line 210. The first rectifier element 215 is disposed between a coupling portion 221 of the first internal power line 210 and the second internal power line 220a and a coupling portion 251 of the first internal power line 210 and the fourth internal power line 250. Second rectifier elements 230a and 230b are disposed on the second internal power line 220a. The second rectifier elements 230a and 230b are disposed between the coupling portion 221 of the first internal power line 210 and the second internal power line 220a and a coupling portion 252 of the second internal power line 220a and the fourth internal power line 250.

A third rectifier element 253 is disposed on the fourth internal power line 250. The third rectifier element 253 is disposed between the coupling portion 251 of the first internal power line 210 and the fourth internal power line 250 and the coupling portion 252 of the second internal power line 220a and the fourth internal power line 250. Fourth rectifier elements 273a and 273b are disposed on the fifth internal power line 270. The fourth rectifier elements 273a and 273b are disposed between the coupling portion 221 of the first internal power line 210 and the fifth internal power line 270 and the coupling portion 252 of the second internal power line 220a and the fifth internal power line 270.

In the integrated ECU 20b of the fifth embodiment, five power supply paths are configured. That is, a first power supply path 217 is a path for supplying power of the second power source 61 to the data processing circuit 200. The first power supply path 217 includes a power source terminal 205b and the first internal power line 210. A second power supply path 224 is a path for supplying power of the fourth ECU to the integrated ECU 20b via the third external data line 50c. The second power supply path 224 includes a first data terminal 201a, a first internal data line 202a, a filter circuit 204a, and the second internal power line 220a. A third power supply path 242 is a path for supplying power of the integrated ECU 20b to the area ECU 30c via the first external data line 50a. The third power supply path 242 includes the third internal power line 240, a filter circuit 204b, a second internal data line 202b, and a second data terminal 201b.

A fourth power supply path 254 is a path for supplying power of the integrated ECU 20b to the fourth ECU via the third external data line 50c. The fourth power supply path 254 includes the fourth internal power line 250, the second internal power line 220a, the filter circuit 204a, the first internal data line 202a, and the first data terminal 201a. A fifth power supply path 225 is a path for supplying power of the area ECU 30c to the integrated ECU 20c via the first external data line 50a. The fifth power supply path 225 includes the second data terminal 201b, the second internal data line 202b, the filter circuit 204b, and the third internal power line 240.

E-1-2-4. Terminal ECU 40b

As is clear from FIG. 10 (and FIG. 11), the terminal ECU 40b has the same configuration as those of the integrated ECU 20b and the area ECU 30c. That is, terminal ECU 40b includes a first internal power line 410a, a second internal power line 420, a third internal power line 440, a fourth internal power line 450, and a fifth internal power line 470.

A first rectifier element 414 is disposed on the first internal power line 410a. The first rectifier element 414 is disposed between a coupling portion 451 of the first internal power line 410a and the fourth internal power line 450 and a coupling portion 421 of the first internal power line 410a and the second internal power line 420. Second rectifier elements 430a and 430b are disposed on the second internal power line 420. The second rectifier elements 430a and 430b are disposed between the coupling portion 421 of the first internal power line 410a and the second internal power line 420 and a coupling portion 452 of the second internal power line 420 and the fourth internal power line 450. A third rectifier element 453 is disposed on the fourth internal power line 450. The third rectifier element 453 is disposed between the coupling portion 451 of the first internal power line 410a and the fourth internal power line 450 and the coupling portion 452 of the second internal power line 420 and the fourth internal power line 450. Fourth rectifier elements 473a and 473b are disposed on the fifth internal power line 470. The fourth rectifier elements 473a and 473b are disposed between the coupling portion 421 of the first internal power line 410a and the fifth internal power line 470 and a coupling portion 452 of the second internal power line 420 and the fifth internal power line 470.

In the terminal ECU 40b of the fifth embodiment, five power supply paths are configured. That is, a first power supply path 417a is a path for supplying power of the third power source 62 to the data processing circuit 400. The first power supply path 417a includes a power source terminal 405 and the first internal power line 410a. A second power supply path 424 is a path for supplying power of the area ECU 30c to the terminal ECU 40b via the second external data line 50b. The second power supply path 424 includes a first data terminal 401a, a first internal data line 402a, a filter circuit 404a, and the second internal power line 420. A third power supply path 442 is a path for supplying power of the terminal ECU 40b to the fifth ECU via the fourth external data line 50d. The third power supply path 442 includes the third internal power line 440, a filter circuit 404b, a second internal data line 402b, and a second data terminal 401b.

A fourth power supply path 454 is a path for supplying power of the terminal ECU 40b to the area ECU 30c via the second external data line 50b. The fourth power supply path 454 includes the fourth internal power line 450, the second internal power line 420, the filter circuit 404a, the first internal data line 402a, and the first data terminal 401a. A fifth power supply path 425 is a path for supplying power of the fifth ECU to the terminal ECU 40b via the fourth external data line 50d. The fifth power supply path 425 includes the second data terminal 401b, the second internal data line 402b, the filter circuit 404b, and the third internal power line 440.

E-1-2-5. First to Fourth External Data Lines 50a to 50d

The first external data line 50a and the second external data line 50b of the fifth embodiment are similar to the first external data line 50a and the second external data line 50b of the fourth embodiment. The third external data line 50c and the fourth external data line 50d of the fifth embodiment have the same configurations as those of the first external data line 50a and the second external data line 50b.

E-2. Effects of Fifth Embodiment

According to the fifth embodiment as described above, the following effects can be obtained in addition to or instead of the effects of the first to fourth embodiments.

That is, according to the fifth embodiment, all of the integrated ECU 20b, the area ECU 30c, and the terminal ECU 40b can have the same configuration (FIGS. 10 and 11). Therefore, it is relatively easy to design or manufacture each of the ECUs 20b, 30c, and 40b.

F. Sixth Embodiment

F-1. Configuration

F-1-1. Overall Configuration

Figure 12:
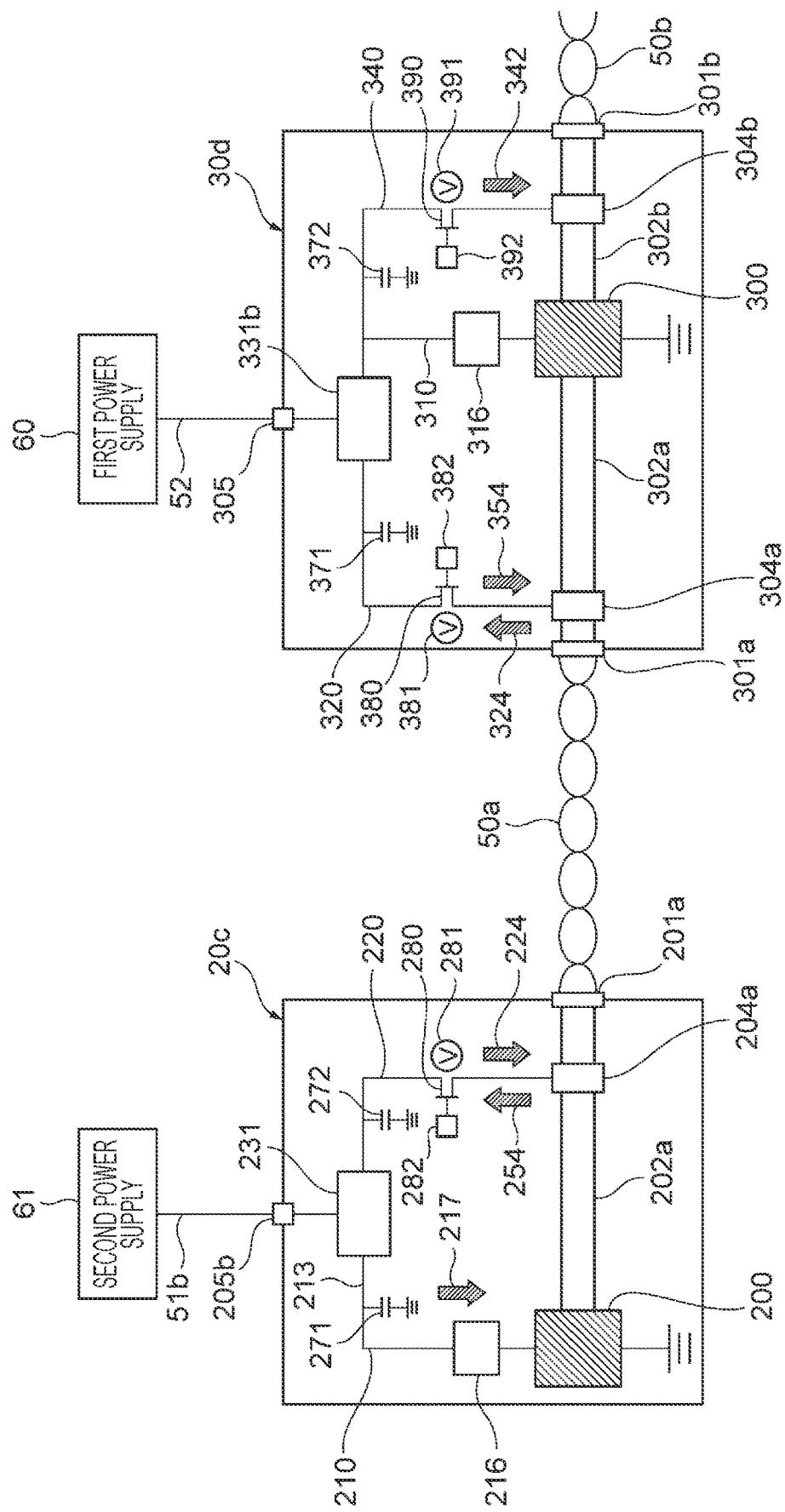
FIG. 12 is a diagram illustrating a configuration of a part of an electronic control system according to a sixth embodiment.
Figure 13:
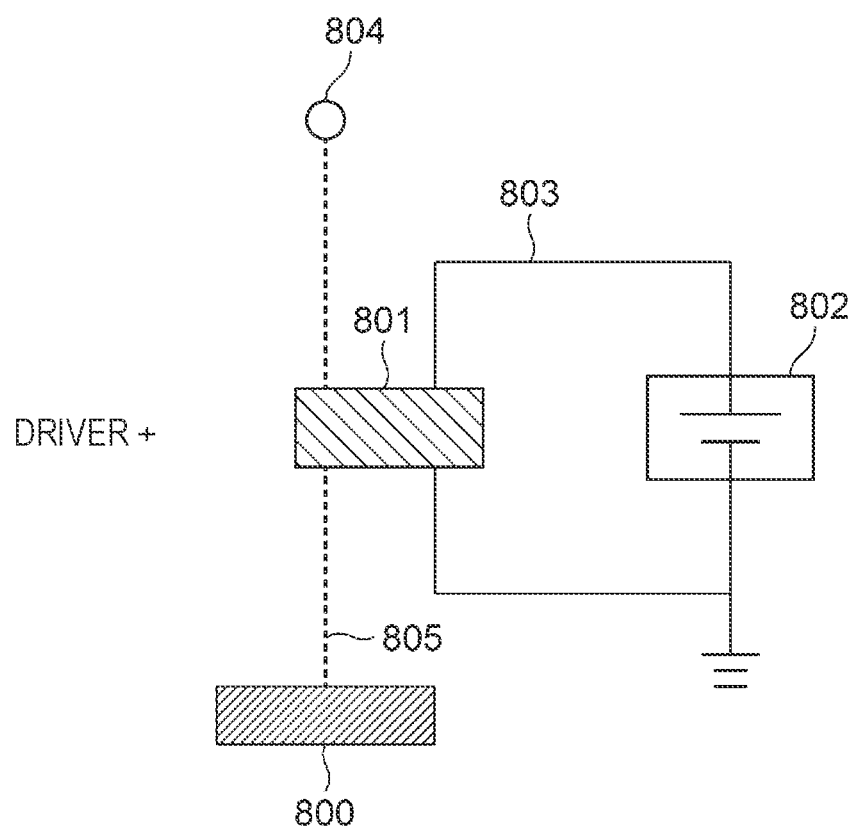
FIG. 13 is a configuration diagram of an automatic brake system of Level 2 as the related art.
Figure 14:
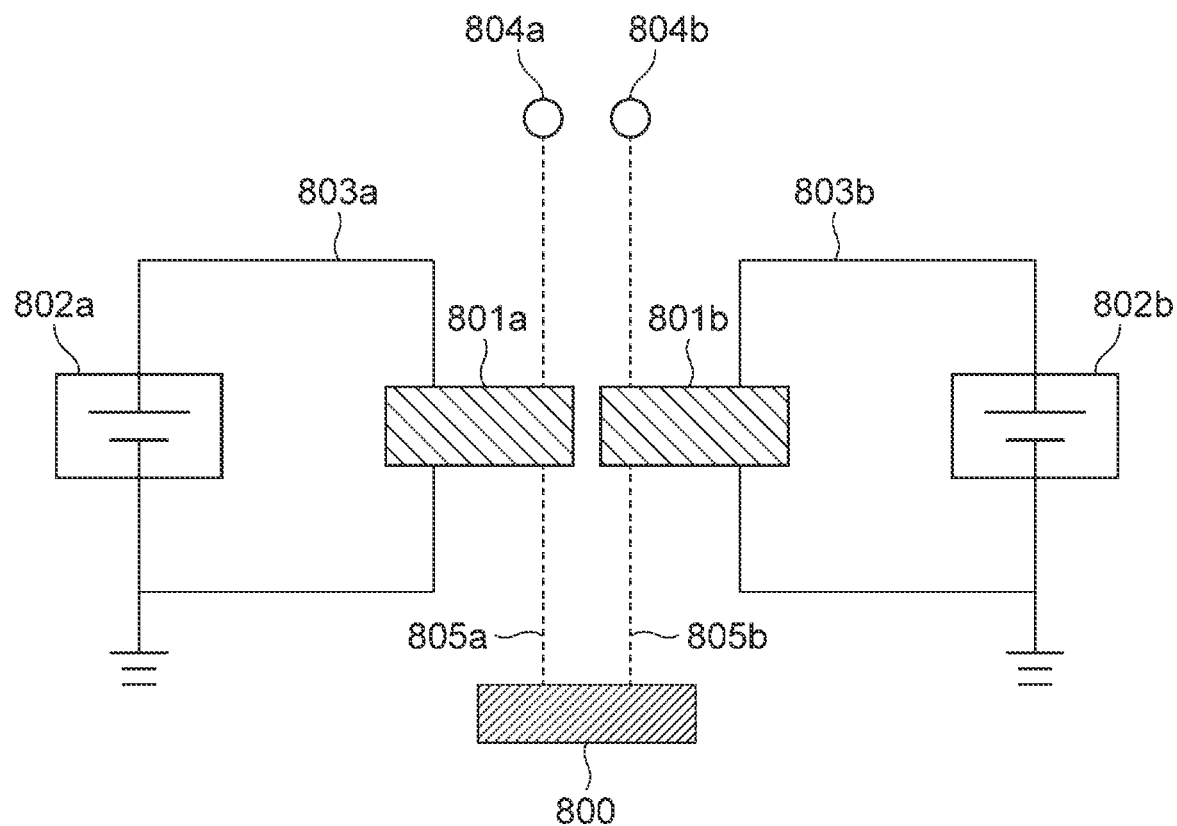
FIG. 14 is a configuration diagram of an automatic brake system at Level 3 as the related art.
Figure 15:
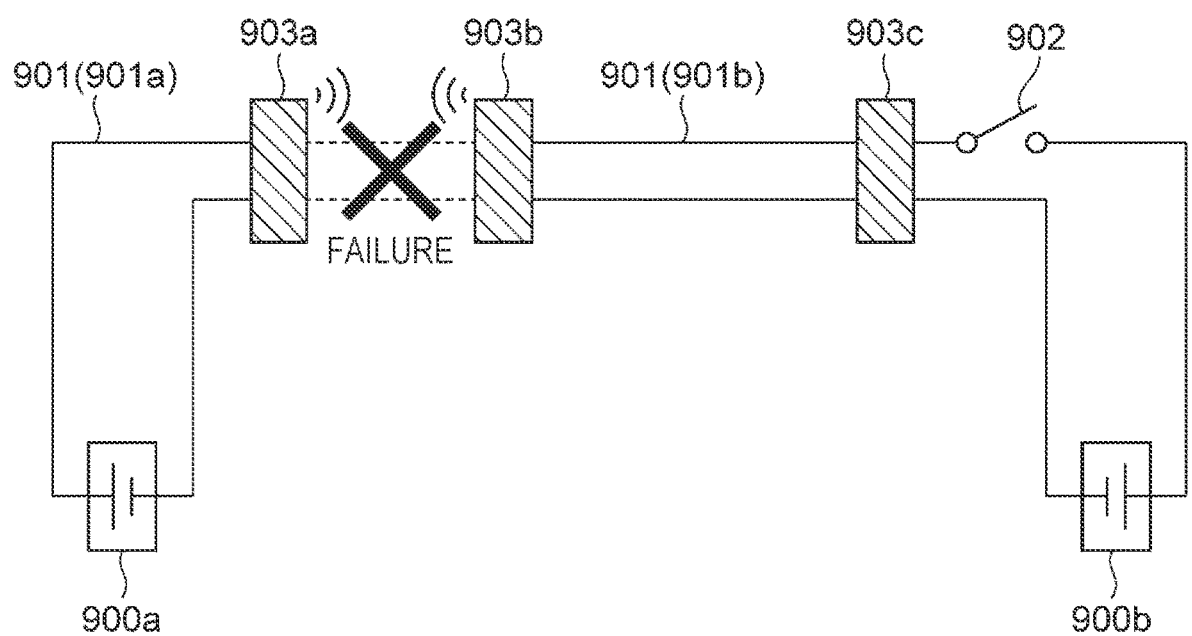
FIG. 15 is a diagram illustrating an example of redundancy of power supply according to the related art.

FIG. 12 is a diagram illustrating a configuration of a part of an electronic control system 11D according to a sixth embodiment. An overall configuration of the electronic control system 11D according to the sixth embodiment is similar to that of the electronic control system 11 (FIG. 1) of the second embodiment. That is, the electronic control system 11D according to the sixth embodiment includes an integrated electronic control device 20c (hereinafter, referred to as "integrated ECU 20c"), an area electronic control device 30d (hereinafter, referred to as "area ECU 30d"), and a terminal ECU (not illustrated in FIG. 12). Hereinafter, among constituent elements of the sixth embodiment, components equivalent to those of the fourth embodiment are denoted by the same reference signs, and a detailed description thereof will be omitted.

The sixth embodiment has a configuration capable of coping with a case where an abnormality occurs in any of power supply paths.

F-1-2. Configuration of Each ECU

F-1-2-1. Outline

FIG. 12 illustrates two ECUs, that is, the integrated ECU 20c and the area ECU 30d. The terminal ECU (corresponding to the terminal ECU 40b in FIG. 8) (not illustrated) exists beyond a second external data line 50b.

F-1-2-2. Integrated ECU 20c

The integrated ECU 20c of the sixth embodiment has a configuration basically similar to that of the integrated ECU 20a of the fourth embodiment (FIG. 8). The integrated ECU 20c further includes a first capacitor 271 and a second capacitor 272. The first capacitor 271 is disposed between a first internal power line 210 (first power supply path 217) and a ground (GND), and stabilizes a power source voltage from a second power source 61 (or a power source voltage from the area ECU 30d). The second capacitor 272 is disposed between a second internal power line 220 (second power supply path 224) and a GND, and stabilizes a power source voltage from the second power source 61 (or a power source voltage from the area ECU 30d).

The integrated ECU 20c includes a first on/off switch 280, a voltage sensor 281, and a switch control unit 282. The first on/off switch 280 is disposed on the second internal power line 220 (in other words, between a power source selection circuit 231 and a first data terminal 201a) to control a flow of a current through the second internal power line 220. As the first on/off switch 280, a power device such as a MOSFET can be used. The voltage sensor 281 detects a voltage across the first on/off switch 280.

The switch control unit 282 electrically performs on/off control by a gate signal for the first on/off switch 280. More specifically, the switch control unit 282 determines an abnormality (overcurrent or the like) in the second internal power line 220 based on a detection value (potential difference) of the voltage sensor 281. The switch control unit 282 turns on the first on/off switch 280 in a normal state (when no abnormality occurs), and turns off the first on/off switch 280 when an abnormality occurs. In addition, a failed power source may be specified based further on a current amount and a current direction.

F-1-2-3. Area ECU 30*d*

The area ECU 30*d* of the sixth embodiment has a configuration basically similar to that of the area ECU 30*b* of the fourth embodiment (FIG. 8). The area ECU 30*d* further includes a first capacitor 371 and a second capacitor 372. The first capacitor 371 is disposed between a second internal power line 320 (second power supply path 324) and a GND, and stabilizes a power source voltage from a first power source 60. The second capacitor 372 is disposed between a third internal power line 340 (third power supply path 342) and a GND, and stabilizes a power source voltage from the first power source 60.

The area ECU 30*d* includes a first on/off switch 380, a first voltage sensor 381, and a first switch control unit 382. The first on/off switch 380 is disposed on the second internal power line 320 (in other words, between a power source selection circuit 331*b* and a first data terminal 301*a*) to control a flow of a current through the second internal power line 320. As the first on/off switch 380, a power device such as a MOSFET can be used. The first voltage sensor 381 detects a voltage across the first on/off switch 380.

The first switch control unit 382 electrically performs on/off control by a gate signal for the first on/off switch 380. More specifically, the first switch control unit 382 determines an abnormality (overcurrent or the like) in the second internal power line 320 based on a detection value (potential difference) of the first voltage sensor 381. The first switch control unit 382 turns on the first on/off switch 380 in a normal state (when no abnormality occurs), and turns off the first on/off switch 380 when an abnormality occurs. In addition, a failed power source (the first power source 60 or the second power source 61) may be specified based further on a current amount and a current direction.

Further, the area ECU 30*d* includes a second on/off switch 390, a second voltage sensor 391, and a second switch control unit 392, and the second on/off switch 390 is disposed on the third internal power line 340 (in other words, between the power source selection circuit 331*b* and a second data terminal 302*b*) to control a flow of a current through the third internal power line 340. As the second on/off switch 390, a power device such as a MOSFET can be used. The second voltage sensor 391 detects a voltage across the second on/off switch 390.

The second switch control unit 392 electrically performs on/off control by a gate signal for the second on/off switch 390. More specifically, the second switch control unit 392 determines an abnormality (overcurrent or the like) in the third internal power line 340 based on a detection value (potential difference) of the second voltage sensor 391. The second switch control unit 392 turns on the second on/off switch 390 in a normal state (when no abnormality occurs), and turns off the second on/off switch 390 when an abnormality occurs. In addition, a failed power source (the first power source 60 or the second power source 61) may be specified based further on a current amount and a current direction.

F-2. Effects of Sixth Embodiment

According to the sixth embodiment as described above, the following effects can be obtained in addition to or instead of the effects of the first to fifth embodiments.

That is, the area ECU 30*d* includes the first on/off switch 380 disposed on the second internal power line 320, the first voltage sensor 381 (measurement means) that measures a voltage on the second internal power line 320, and the first switch control unit 382 (switch control means) that turns on the first on/off switch 380 when a voltage on the second internal power line 320 has a normal value, and turns off the first on/off switch 380 when the voltage on the second internal power line 320 has an abnormal value.

As a result, when a voltage abnormality occurs in the second internal power line 320, it is possible to stop power supply from (to) the integrated ECU 20*c* (another first electronic control device) to (from) the area ECU 30*d* (electronic control device).

The same applies to the second on/off switch 390 of the area ECU 30*d* and the first on/off switch 280 of the integrated ECU 20*c*.

G. Modified Example

In each of the above embodiments, the in-vehicle network system has been described as an example, but application to other than vehicles is also possible. For example, the present invention is also applicable to other transportation means such as an aircraft, a ship, and a train. The present invention can also be applied to plants (factories, power plants, and the like).

Further, each embodiment can be applied to a domain architecture configuration in addition to a zone architecture configuration. Therefore, even in a case where a zone architecture configuration and a domain architecture configuration are mixed in a vehicle or the like, the present invention can be applied to each of the zone architecture configuration and the domain architecture configuration.

Although the embodiments of the present invention have been described in detail above, the present invention is not limited to the above embodiments, and various design changes can be made without departing from the spirit of the present invention described in the claims. For example, the above-described embodiments have been described in detail in order to explain the present invention in an easy-to-understand manner, and the present invention is not necessarily limited to those having all the configurations described. Further, a part of a configuration of an embodiment can be replaced with a configuration of another embodiment, and to a configuration of an embodiment, a configuration of another embodiment can be added. In addition, a part of the configuration of each embodiment can be added with another configuration, can be deleted, and can be replaced with another configuration.

REFERENCE SIGNS LIST

11, 11A to 11D electronic control system
20, 20*a* to 20*c* integrated ECU (another first electronic control device)
30, 30*a* to 30*d* area ECU (electronic control device)

40, 40a to 40b terminal ECU (another second electronic control device)
50a first external data line
50b second external data line
52 first power source line
60 first power source
61 second power source
300 data processing circuit
301a first data terminal
301b second data terminal
302a first internal data line
302b second internal data line
304a, 304b filter circuit
305 power source terminal
308 high-pass filter
309 low-pass filter
310 first internal power line
314 first rectifier element
316 DC/DC converter
317 first power supply path
320 second internal power line
321 first power line coupling portion
324 second power supply path
330a, 330b second rectifier element
331, 331a to 331c power source selection circuit
340 third internal power line
341 second power line coupling portion
342 third power supply path
350 fourth internal power line
351 third power line coupling portion
352 fourth power line coupling portion
353 third rectifier element
380 first on/off switch (on/off switch)
381 first voltage sensor (measurement means)
382 first switch control device (switch control means)
280 second on/off switch (on/off switch)

The invention claimed is:

1. An electronic control device comprising:
a data processing circuit that performs data communication with one or more another electronic control devices;
a power source terminal that is connected to a first power source;
a first data terminal to which a first external data line for performing data communication with the another electronic control device and receiving power supplied from the another electronic control device is connected;
a first internal data line that connects the first data terminal and the data processing circuit and transfers a data signal from the first data terminal to the data processing circuit; and
a power source selection circuit that has an input side to which the power source terminal and the first data terminal are connected and an output side to which the data processing circuit is connected, selects any one with a higher potential of power to be supplied to the data processing circuit from the power source terminal and the first data terminal on the input side, and connects the selected one to the data processing circuit on the output side.

2. The electronic control device according to claim 1, comprising a second data terminal to which a second external data line for performing data communication with another electronic control device different from the another electronic control device and supplying power to the another different electronic control device is connected, wherein the output side of the power source selection circuit is connected to the data processing circuit and the second data terminal.

3. The electronic control device according to claim 1, wherein
the power source selection circuit includes:
a first voltage drop portion that drops a voltage between the power source terminal and the data processing circuit; and
a second voltage drop portion that drops a voltage between the first data terminal and the data processing circuit, and
the second voltage drop portion has a larger voltage drop than the first voltage drop portion.

4. The electronic control device according to claim 3, wherein
the first voltage drop portion includes one or more first rectifier elements, and
the second voltage drop portion includes more second rectifier elements than the first rectifier elements, the second rectifier elements being of the same specification as the first rectifier elements.

5. An electronic control system comprising a first electronic control device including a first data processing circuit and a second electronic control device including a second data processing circuit, the first electronic control device and the second electronic control device performing bidirectional data communication with each other,
wherein
the first electronic control device includes: a power source terminal that is connected to a first power source; a first data terminal to which a first external data line for performing data communication with the second electronic control device and receiving power supplied from the second electronic control device is connected; a first internal data line that connects the first data terminal and the first data processing circuit and transfers a data signal from the first data terminal to the first data processing circuit; and a first power source selection circuit that has an input side connected to the power source terminal and the first data terminal and an output side connected to the first data processing circuit, selects any one with a higher potential of power to be supplied from the power source terminal and the first data terminal on the input side, and connects the selected one to the first data processing circuit on the output side, and
the second electronic control device includes: a first power source terminal connected to the first power source; a second power source terminal connected to a second power source; a first data terminal to which the first external data line is connected; a first internal data line that connects the first data terminal and the second data processing circuit and transfers a data signal from the first data terminal to the second data processing circuit; a first internal power line that connects the first and second power source terminals and the second data processing circuit; a second internal power line that connects the first and second power source terminals and the first data terminal; and a rectifier circuit that supplies, to the second internal power line, power of any one with a higher potential among the first power source and the second power source.

6. An electronic control system comprising a first electronic control device including a first data processing circuit and a second electronic control device including a second data processing circuit, the first electronic control device and the second electronic control device performing bidirectional data communication with each other,
wherein
the first electronic control device includes: a first power source terminal that is connected to a first power source; a first data terminal to which a first external data line for performing data communication with the second electronic control device and receiving power supplied from the second electronic control device is connected; a first internal data line that connects the first data terminal and the first data processing circuit and transfers a data signal from the first data terminal to the first data processing circuit; and a first power source selection circuit that has an input side connected to the first power source terminal and the first data terminal and an output side connected to the first data processing circuit, selects any one with a higher potential of power to be supplied from the first power source terminal and the first data terminal on the input side, and connects the selected one to the first data processing circuit on the output side; and
the second electronic control device includes: a second power source terminal connected to a second power source; a data terminal to which the first external data line is connected; an internal data line that connects the data terminal and the second data processing circuit and transfers a data signal from the data terminal to the second data processing circuit; and a second power source selection circuit that has an input side connected to the second power source terminal and the data terminal and an output side connected to the second data processing circuit, selects any one with a higher potential of power to be supplied from the second power source terminal and the data terminal on the input side, and connects the selected one to the second data processing circuit on the output side.

7. The electronic control system according to claim 6, comprising a third electronic control device including a third data processing circuit that performs bidirectional data communication with the first electronic control device, wherein
the first electronic control device includes a second data terminal to which a second external data line for performing data communication with the third electronic control device and supplying power to the third electronic control device is connected, and
the output side of the first power source selection circuit is connected to the second data processing circuit and the second data terminal.

8. The electronic control system according to claim 7, wherein
the first electronic control device includes a first voltage sensor that measures a voltage between the first data terminal and the first power source selection circuit, a first on/off switch that electrically short-circuits or opens between the first data terminal and the first power source selection circuit, and a first switch control unit that controls the first on/off switch based on a measurement result of the first voltage sensor, and
the second electronic control device includes a second voltage sensor that measures a voltage between the second data terminal and the second power source selection circuit, a second on/off switch that electrically short-circuits or opens between the second data terminal and the second power source selection circuit, and a second switch control unit that controls the second on/off switch based on a measurement result of the second voltage sensor.

9. The electronic control system according to claim 8, wherein
the first switch control unit controls the first on/off switch based on a potential difference across the first on/off switch, and
the second switch control unit controls the second on/off switch based on a potential difference across the second on/off switch.

10. The electronic control system according to claim 8, wherein
the first switch control unit performs control to open the first on/off switch when a potential difference across the first on/off switch is equal to or larger than a first threshold, and
the second switch control unit performs control to open the second on/off switch when a potential difference across the second on/off switch is equal to or larger than a second threshold.

* * * * *